United States Patent [19]
Yoshimoto et al.

[11] Patent Number: 5,251,194
[45] Date of Patent: Oct. 5, 1993

[54] TECHNIQUES FOR CONTROLLING BEAM POSITION AND FOCUS IN OPTICAL DISK DRIVES

[75] Inventors: Kyosuke Yoshimoto; Osamu Ito; Kimiyuki Koyanagi; Yoshiki Nakajima; Shuitsu Takeda; Kyoji Shimoda, all of Amagasaki, Japan

[73] Assignee: Mitsubishi Denki Kabushiki Kaisha, Tokyo, Japan

[21] Appl. No.: 513,079

[22] Filed: Apr. 12, 1990

[30] Foreign Application Priority Data

| Apr. 17, 1989 | [JP] | Japan | 1-98136 |
| Jun. 5, 1989 | [JP] | Japan | 1-142441 |
| Jun. 13, 1989 | [JP] | Japan | 1-150881 |
| Jul. 4, 1989 | [JP] | Japan | 1-173343 |
| Jul. 4, 1989 | [JP] | Japan | 1-173344 |
| Jul. 20, 1989 | [JP] | Japan | 1-189632 |
| Jul. 20, 1989 | [JP] | Japan | 1-189633 |
| Dec. 7, 1989 | [JP] | Japan | 1-318524 |
| Feb. 22, 1990 | [JP] | Japan | 2-43236 |

[51] Int. Cl.$^5$ .............................. G11B 7/095
[52] U.S. Cl. ...................... 369/44.26; 369/44.29; 369/44.34; 369/50
[58] Field of Search .......... 369/44.27, 44.28, 44.11, 369/32, 50, 44.13, 44.26, 44.34, 54, 58, 48, 47, 44.35, 44.36, 116; 360/77.06, 77.04

[56] References Cited

U.S. PATENT DOCUMENTS

| 4,419,701 | 12/1983 | Harrison et al. | 360/77.02 |
| 4,631,713 | 12/1986 | Romeas et al. | 369/54 |
| 4,730,290 | 3/1988 | Takasago et al. | 369/32 |
| 4,755,980 | 7/1988 | Yoshimaru et al. | 369/54 |
| 4,769,801 | 9/1988 | Funada et al. | 369/44.29 |
| 4,797,756 | 1/1989 | Yoshihara et al. | 360/77.02 |
| 4,812,726 | 3/1989 | Benii et al. | |
| 4,823,330 | 4/1989 | Arter et al. | 369/44.35 |
| 4,835,755 | 3/1989 | Kusano | 369/44.23 |
| 4,866,688 | 9/1989 | Ohtake et al. | 369/44.13 |
| 4,878,135 | 10/1989 | Makino et al. | 360/77.04 |
| 4,907,212 | 3/1990 | Pharris et al. | 369/58 |
| 4,914,725 | 4/1990 | Belser et al. | 306/77.06 |
| 4,942,564 | 7/1990 | Hofer et al. | 369/44.35 |
| 4,977,551 | 12/1990 | Minami et al. | 369/44.34 |
| 5,048,002 | 9/1991 | Horie et al. | 369/44.35 |

FOREIGN PATENT DOCUMENTS

| 0247829 | 12/1987 | European Pat. Off. |
| 0260987 | 3/1988 | European Pat. Off. |
| 0304932 | 3/1989 | European Pat. Off. |
| 2158611 | 11/1985 | United Kingdom. |

OTHER PUBLICATIONS

"A Precise Servo In An Optical Disk Memory", System and Control, vol. 27, No. 11, pp. 704–710, 1983.

Primary Examiner—W. R. Young
Assistant Examiner—Nabil Hindi
Attorney, Agent, or Firm—Wolf, Greenfield & Sacks

[57] ABSTRACT

An optical disk drive for recording and reproducing information on an optical disk medium includes a servo circuit for controlling tracking of a light beam on a predetermined track and a servo circuit for controlling focus of the light beam on the disk surface. The disk surface is divided into a plurality of regions, and calibration values for adjusting the servo circuits are determined in each region. The calibration values are stored in a memory and are used to adjust the servo circuits during tracking on a predetermined track. The calibration values include tracking offset values, focus offset values, servo deviation threshold values and sensor gain values. A number of techniques are disclosed for automatically determining the calibration values.

25 Claims, 27 Drawing Sheets

TECHNIQUES FOR CONTROLLING BEAM POSITION AND FOCUS IN OPTICAL DISK DRIVES

FIELD OF THE INVENTION

This invention relates to an optical disk drive for recording and reproducing information onto and from an optical disk or an optical magnetic disk (hereinafter referred to as an optical disk) and, more particularly, to a servo system for stable and accurate operation of an optical disk drive.

BACKGROUND OF THE INVENTION

An optical disk is formed as a disk-shaped substrate typically having one or more magnetic layers thereon. Information is stored on the disk in spiral or concentric tracks. Information is recorded on the disk and information is reproduced from the disk using a light beam that is focused on a desired track as the disk is rotated. The light beam is generated in an optical head and is directed at the disk surface in a perpendicular direction. The optical head does not contact the disk surface. It has been found necessary to provide a servo system for focus control and tracking control in order to record and reproduce correct information. The servo system is required to provide stable operation independent of variations in the signal processing system, the optical system, the disk driving system and individual differences among optical disk media.

By way of example, an optical disk may have a track pitch, or spacing, between adjacent tracks of 1.6 micrometers. However, the disk eccentricity may be up to 100 micrometers. Thus, a tracking servo is required to maintain the light beam on the desired track during recording and reproduction. The spacing between the objective lens of the optical system and the disk surface may be on the order of 1.5 mm, whereas the focal depth of the optical system may be on the order of one micrometer. Since the disk is not perfectly flat and may be tilted relative to the axis of rotation, a focus servo is required to maintain the light beam focused on the disk surface.

Various techniques are known for optical detection of focus errors and tracking errors. In the so called "knife edge" method of focus detection, a sharp edge is located at the focal point of the condenser lens in the optical system. A pair of photodetectors senses light reflected from the disk surface. When the beam is focused on the disk surface, the photodetectors provide equal outputs to a differential amplifier, and the output of the differential amplifier is zero. When the light beam is not focused on the disk surface, part of the reflected light is blocked by the knife edge and the differential amplifier provides a nonzero output voltage. The polarity of the output voltage indicates the direction of the focus error. Since the dynamic range of the focus sensor is small, it is customary to use a focus search to bring the focus servo into the range of the focus sensor.

The tracking sensor also utilizes a pair of photodetectors which receive the reflected beam from the disk surface. The outputs of the tracking photodetectors are connected to a differential amplifier. On the disk surface, each data track is typically centered between a pair of guide grooves. The guide grooves diffract the light beam. When the light beam is centered on the data track, the guide grooves on opposite sides of the data track diffract the light beam equally, and each photosensor receives the same signal. As the light beam deviates from the track center and moves closer to one of the grooves, the diffracted beam changes and the output of the differential amplifier increases. The polarity of the differential amplifier output represents the direction of the deviation from the track center. The tracking signal as the beam moves from an outer edge of the track to an inner edge of the track is a sinusoidal function of radial position and crosses the zero level at the center of the data track.

The servo systems utilized in an optical disk drive typically have offsets. Offsets are errors that occur even through the signals provided to the servo system indicate no errors. Offsets may originate for example from optical misalignment. In the prior art, it has been customary to adjust the optical disk drive in the factory to remove focus and tracking offsets. However, in spite of careful initial adjustments, additional offsets may be caused by environmental factors, shock and vibration, differences between media, aging and the like. When such offsets occur, accurate tracking and focus control cannot be achieved.

During recording of data on the optical disk, it is important to maintain the recording light beam on a predetermined track. If the light beam jumps to an adjacent track, data recorded on that track is likely to be destroyed. To insure that the light beam follows the desired track, the tracking signal discussed above is compared with a servo deviation threshold level. If the threshold level is exceeded, recording is interrupted. In the prior art, a fixed threshold level has been utilized. If the tracking signal varies in amplitude as a result of groove variations, disk tilt, focus errors and the like, a larger or smaller amplitude tracking signal is compared with a fixed threshold level. When the tracking signal is smaller than its normal amplitude, a larger deviation from the track center is required before the threshold level is exceeded. For very small amplitude tracking signals, the threshold level may not be reached for any deviation of the light beam from the desired track center. When the tracking signal is larger than its normal amplitude, the servo deviation threshold may be exceeded and recording may be interrupted, even though the light beam remains sufficiently aligned with the desired track.

It is desirable to provide an optical disk drive having a servo system which operates in a stable and accurate manner regardless of tracking offsets, focus offsets, sensor amplitude variations and the like. It is a general object of the present invention to provide improved optical disk drives.

SUMMARY OF THE INVENTION

According to the present invention, these and other objects and advantages are achieved in an optical disk drive. The optical disk drive includes means for rotating an optical disk medium, an optical head for directing a light beam at the optical disk and for sensing a light beam reflected from the optical disk, means for moving the optical head in a radial direction for accessing different tracks on the optical disk and a servo system for controlling tracking and focus during recording and reproduction on the optical disk.

The servo system includes means for mapping one or more calibration values at a plurality of regions on the optical disk and means for adjusting a servo control circuit in accordance with the calibration values for each region during recording and reproduction. In mapping, the optical disk is divided into a plurality of regions, and calibration values representative of each region are determined. The calibration values include tracking offset, focus offset, sensor gain, servo deviation threshold and the like. The calibration values are stored in a memory and are subsequently used to adjust the servo circuit on a region-by region basis during tracking.

According to a feature of the invention, the tracking offset is determined by issuing a track jump command which causes the light beam to traverse one or more tracks on the disk surface. The maximum and minimum values of a tracking sensor signal are measured for each one way movement of the light beam across a track. A median value between the maximum and minimum values is determined. The tracking offset is the difference between the median value and the zero value. A tracking offset is determined in this manner for each region on the optical disk.

The tracking offset can be determined during a seek operation in which the light beam is moved according to a predetermined velocity profile between a current track and a target track. The tracking offset value is determined from the maximum and minimum values of the tracking signal as described above during the relatively low velocity portions near the beginning and the end of the seek operation.

According to another feature of the invention, the optical disk drive includes a status observer circuit for measuring and correcting velocity. The status observer circuit issues a command to move the light beam at a constant low velocity in a radial direction. The tracking offset is determined from the maximum and minimum values of the tracking signal as described above.

According to a further feature of the invention, the tracking signal, which nominally crosses a zero level at the center of a data track, and the track cross signal, which reaches a maximum amplitude at the center of the data track, are monitored simultaneously. When the track cross signal reaches maximum amplitude, thereby indicating the center of a data track, the amplitude of the tracking signal is determined. The difference between the measured value of the tracking signal and the zero level is the tracking offset value.

According to another feature of the invention, the tracking offset is determined by measuring the amplitude of the header data signal for three different tracking offset values. The three measured values define an upwardly convex quadratic curve. The offset corresponding to the maximum of the quadratic curve represents the optimal tracking offset.

According to another feature of the invention, the maximum and minimum values of the tracking signal are measured for two different values of DC actuator drive current. These values are used to determine an actuator drive current which provides zero offset.

According to a further feature of the invention, the amplitude of the tracking signal is measured in each region of the optical disk. A sensor gain required to maintain a desired tracking signal amplitude is determined. During recording and reproduction, the sensor gain is adjusted to provide the desired tracking signal amplitude in each region of the optical disk.

According to still another feature of the invention, a servo deviation threshold is determined for each region of the optical disk. The deviation threshold is a fraction of the peak-to peak amplitude of the tracking signal.

The servo deviation threshold varies with the tracking signal amplitude, and a constant deviation distance is required to interrupt recording in all regions of the optical disk.

According to a further feature of the invention, a focus offset value is determined for each region of the optical disk. According to one technique for determining focus offset, three values of focus offset are successively issued to a focus servo circuit. The amplitude of the tracking signal is measured for each focus offset value. The three measured amplitudes define an upwardly-convex quadratic function. The focus offset at the maximum of the quadratic function corresponds to the optimal focus offset.

According to another technique for determining a focus offset value, the amplitude of the track cross signal is determined for three different values of focus offset. The measured values define an upwardly convex quadratic function which is used to determine the optimal focus offset in the manner described above.

The focus offset value can also be determined by measuring the reproduced signal amplitude for three different values of focus offset in the manner described above.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

The present invention relates to mapping of servo control calibration values in a plurality of regions on an optical disk medium and to using the mapped calibration values to adjust the appropriate parameters when the optical disk is started or accessed. The calibration values include tracking offset, focus offset, sensor gain, servo deviation threshold and the like.

Figure 1A:
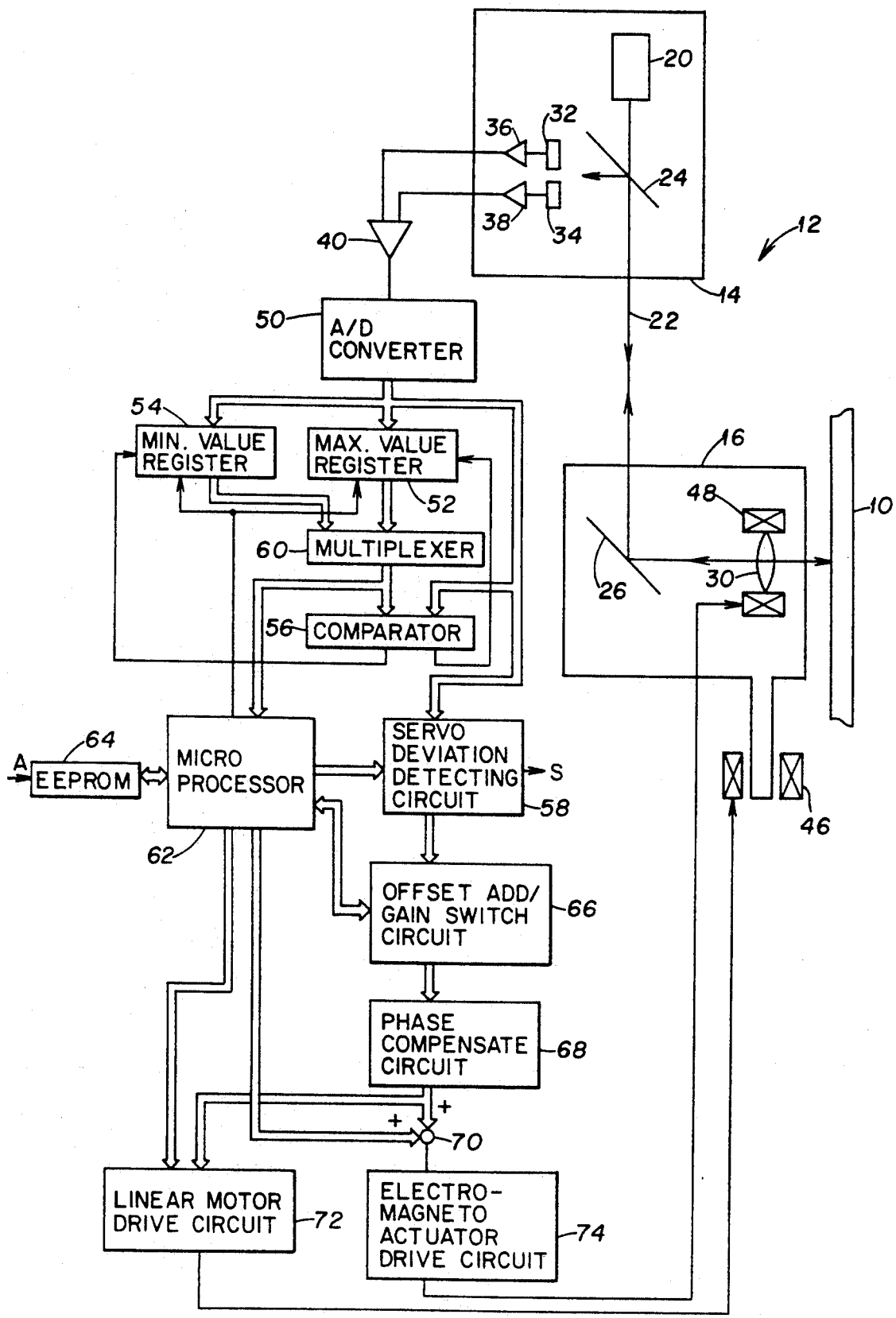
FIG. 1(a) is a schematic block diagram of an optical disk drive provided with a tracking servo circuit.
Figure 1B:
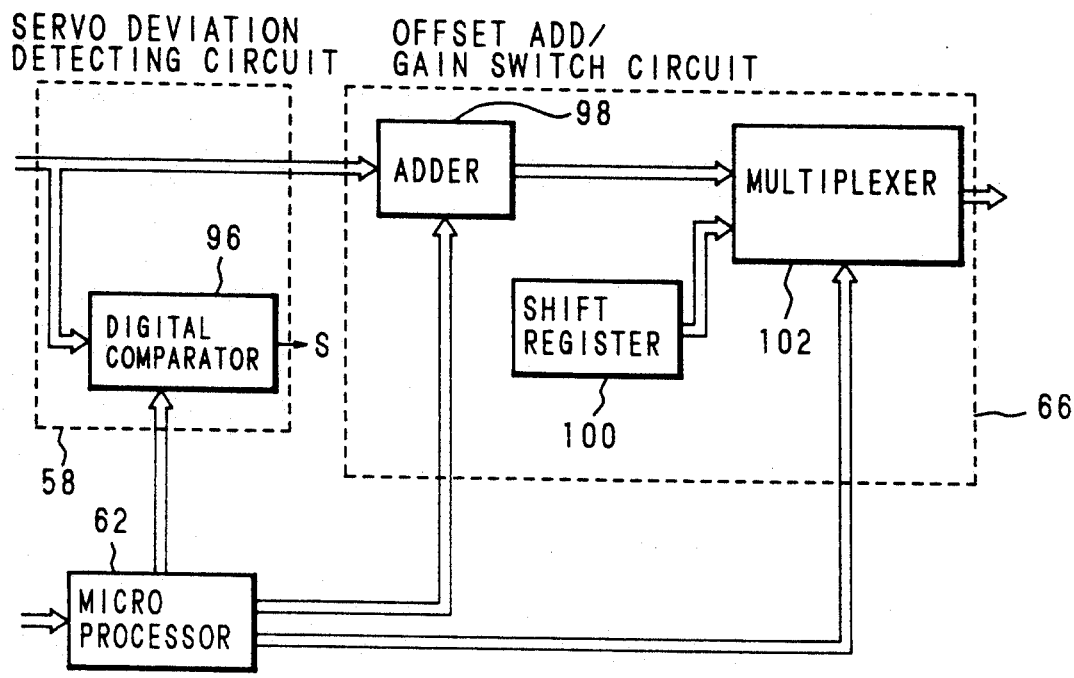
FIG. 1(b) is a block diagram showing details of the servo deviation detecting circuit and the offset add-/gain adjust circuit of FIG. 1.
Figure 1C:
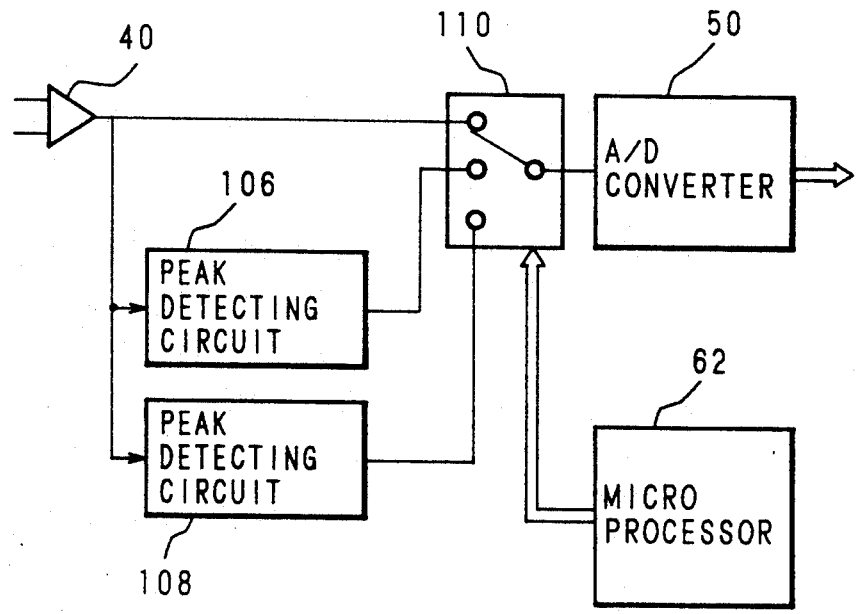
FIG. 1(c) is a block diagram showing an alternate embodiment of part of the optical disk drive of FIG. 1.

A block diagram of an optical disk drive configuration for measuring tracking offset is shown in FIG. 1. An optical disk medium 10, shown partially in FIG. 1, is rotated by a suitable motor drive system (not shown). An optical head 12, including a fixed optical head portion 14 and a movable optical head portion 16, is positioned under optical disk 10. A light emitting device 20, typically a laser diode, mounted on fixed head portion 14 directs a light beam 22 through a beam splitter 24 to a mirror 26 mounted on the movable head portion 16. The light beam is directed by mirror 26 through an objective lens 30 and is projected in a perpendicular direction onto the optical disk 10. The optical disk typically includes at least one magnetic layer which alters the light beam reflected from the optical disk in accordance with the state of magnetization of the magnetic layer in the area being illuminated. Light reflected from the surface of the optical disk 10 passes through the objective lens 30 and is reflected by mirror 26 and beam splitter 24 to photodetectors 32 and 34. The outputs of photodetectors 32 and 34 are connected through preamplifiers 36 and 38, respectively, to the positive and negative inputs of a differential amplifier 40.

The movable optical head portion 16 is mounted on a carriage 44 and performs a seeking operation by movement in the radial direction, R, of the optical disk 10. A linear motor 46 provides coarse movement in the radial direction, and an electromagnetic actuator 48 attached to the objective lens 30 provides fine movement in the radial direction. The movable head portion 16 has a low mass to permit high speed movement.

The output of differential amplifier 40 is connected to an analog to digital converter (ADC) 50. The output of ADC 50 is connected to the inputs of a maximum value register 52 and a minimum value register 54, one input of a comparator 56 and a servo deviation detecting circuit 58. The outputs of registers 52 and 54 are connected to the inputs of a multiplexer 60. The output of multiplexer 60 is connected to the other input of comparator 56 and to a microprocessor 62. The outputs of comparator 56 control loading of registers 52 and 54.

The output of servo deviation detection circuit 58 is connected through an offset add/gain switch circuit 66 to a phase compensation circuit 68 which provides phase compensation for the servo loop. The output of phase compensation circuit 68 is connected to one input of an adder 70 and to a linear motor drive circuit 72. The microprocessor 62 provides a second input to adder 70 and an input to linear motor drive circuit 72. The output of adder 70 is coupled through an electromagnetic actuator drive circuit 74 to actuator 48. The output of linear motor drive circuit 72 is connected to linear motor 46.

The details of the servo deviation detecting circuit 58 and the offset add/gain switch circuit 66 are shown in FIG. 1A. The output of ADC 50 is coupled directly through the servo deviation detecting circuit 58 to the input of offset add/gain switch circuit 66 and is also coupled to one input of a digital comparator 96. The microprocessor 62 provides a servo deviation threshold, as described hereinafter, to the other input of digital comparator 96. When the output of ADC 50 exceeds the servo deviation threshold, the digital comparator 96 provides an out of-servo signal S, which is typically used to interrupt recording. The offset add/gain switch circuit 66 includes an adder 98 which receives the output of ADC 50 at one input and a tracking offset value from microprocessor 62 at its other input. The output of adder 98, which is a corrected tracking signal, is provided to the input of a shift register 100 and to one input of a multiplexer 102. The gain of the tracking signal is adjusted by bit shifting in the shift register 100 under control of the microprocessor 62. A sensor gain value is determined as described hereinafter. Under control of the microprocessor 62, the multiplexer 102 selects either the output of the adder 98 or the gain controlled output of shift register 100. The output of multiplexer 102 is provided to the phase compensation circuit 68.

Figure 2:
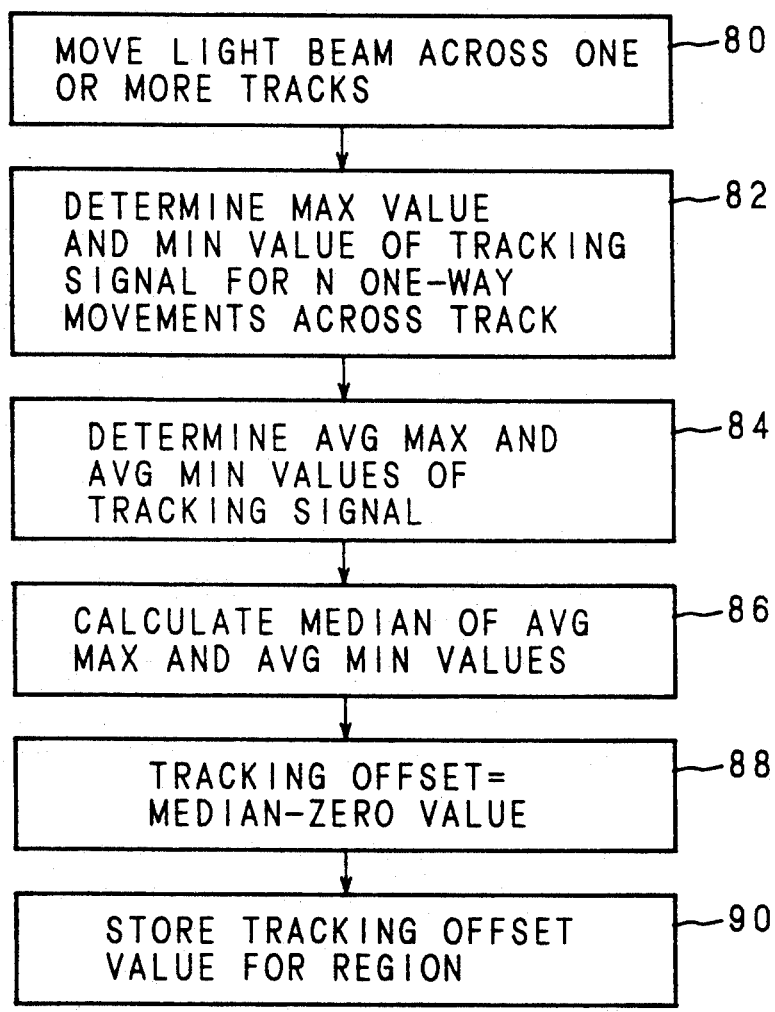
FIG. 2 is a flow chart showing a method for determining tracking offset value.
Figure 3:
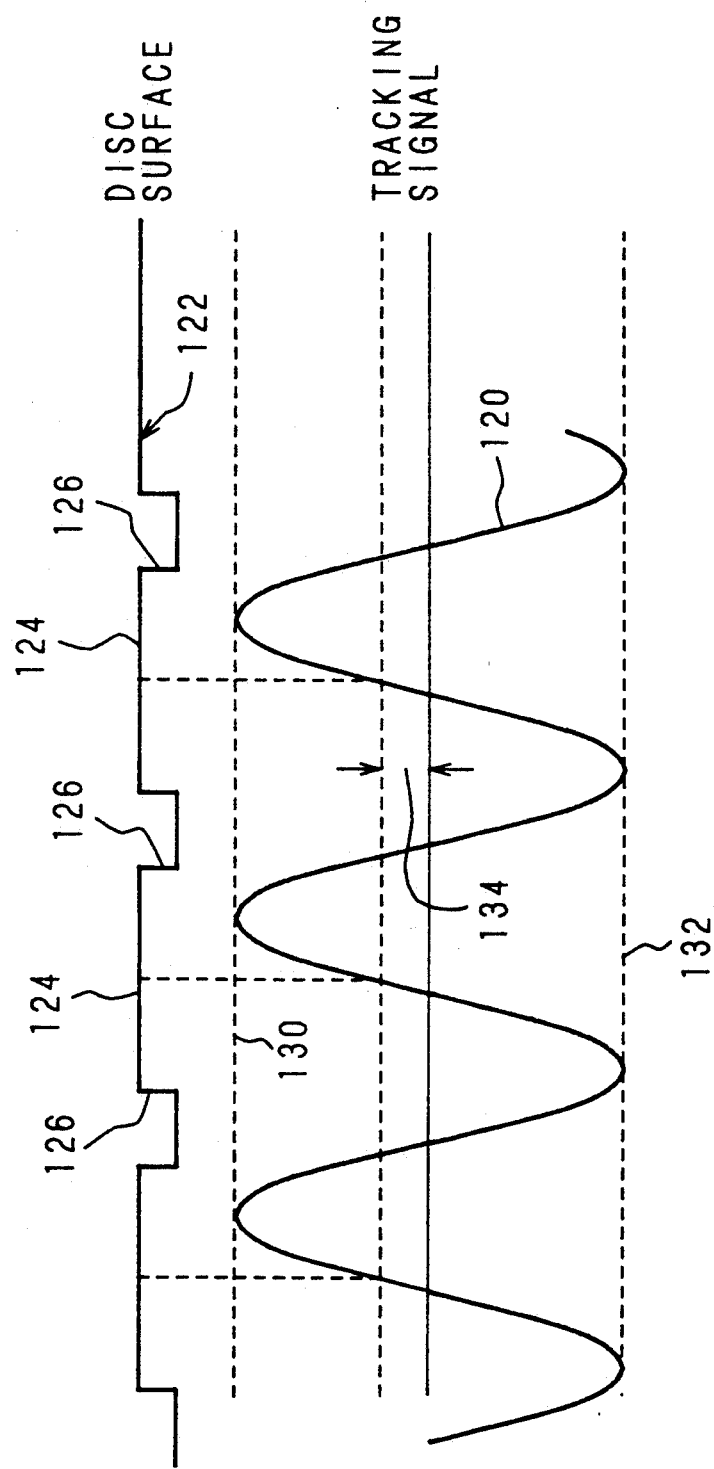
FIG. 3 is a graph showing the contour of the disk surface and the tracking signal as a function of radial position on the optical disk.

A flow diagram of a method for determining tracking offset is shown in FIG. 2. In order to measure tracking offset in a predetermined region of the optical disk 10, a track jump command signal is issued by the microprocessor 62 through adder 70 and actuator drive circuit 74 to electromagnetic actuator 74 while the optical head is tracking on a predetermined track of the optical disk. The track jump command signal causes the light beam to be moved (step 80) alternately from the inner peripheral edge to the outer peripheral edge of the predetermined track and from the outer peripheral edge to the inner peripheral edge of the track. When the light beam is moved in this manner, the output of the differential amplifier 40 is a sinusoidal tracking signal as indicated in FIG. 3 by waveform 120. The tracking signal 120 is plotted as a function of radial position on disk surface 122. On disk surface 122, data tracks 124 are centered between guide grooves 126. As shown in FIG. 3, the tracking signal 120 crosses the zero level at the center of the data track when the system is perfectly aligned. A tracking offset causes the tracking signal to have a non zero value at the center of the data track.

During movement of the light beam across the predetermined track, the output of differential amplifier 40 is digitized by ADC 50. The output of ADC 50 is alternately compared by comparator 56 with the contents of maximum value register 52 and minimum value register 54. Depending on the results of the comparison, the output of ADC 50 may be loaded into one of the registers 52 and 54. When the multiplexer 60 provides the contents of maximum value register 52 to comparator 56 and the output of ADC 50 is larger than the contents of register 52, the output of ADC 50 is loaded into maximum value register 52 to provide a new maximum value. When the output of ADC 50 is smaller than the contents of maximum value register 52, register 52 is not updated. Similarly, when the multiplexer 60 provides the contents of minimum value register 54 to comparator 56 and the output of ADC 50 is smaller than the contents of minimum value register 54, the output of ADC 50 is loaded into minimum value register 54 to provide a new minimum value. When the output of ADC 50 is larger than the contents of minimum value register 54, register 54 is not updated. By repeating this process for each output of ADC 50, the maximum and minimum values of the sinusoidal tracking signal are stored in the registers 52 and 54, respectively.

After each one way movement across the predetermined track, the maximum and minimum values stored in registers 52 and 54 are loaded into microprocessor 62, and the registers 52 and 54 are reset. The maximum and minimum values of the tracking signal are preferably determined (step 82) for a number of one way movements across the predetermined track. The measured values are averaged in step 84 to provide an average maximum value 130 and an average minimum value 132, as shown in FIG. 3. By obtaining several measurements and averaging the measurements, the accuracy of the maximum and minimum values is increased. The microprocessor then calculates the median between the average maximum and the average minimum values in step 86. The difference between the calculated median and the zero level is the tracking offset value (step 88), as shown in FIG. 3 at 134. The tracking offset value is stored in memory 64 (step 90).

Next, mapping of calibration values is described. It has been found that errors, such as tracking offset, associated with recording and reproduction of information on the optical disk vary with position on the optical disk. Thus, when fixed calibration values are used for the entire disk, the errors are not fully corrected. As shown in FIG. 4, the optical disk medium is divided into a plurality of regions (regions 1-16 in FIG. 4), and the tracking offset is determined as described above for each region. The light beam is made to move or jump from the inner peripheral edge to the outer peripheral edge of a selected track in region 1 by a track jump command signal issued by microprocessor 62 to actuator 48. The maximum and minimum values of the tracking signal are obtained as described above for each one way movement. The average maximum values and the average minimum value are determined for region 1. The median between the average maximum and average minimum values is determined and the difference between the median and the zero level (tracking offset value for region 1) is stored by the microprocessor 62 in the memory 64. During rotation of the optical disk, the tracking offset values for region 5, region 9 and region 13 are calculated and stored in the same manner. Subsequently, the light beam is moved to a predetermined track in region 2 and the tracking offset value for region 2 is calculated and stored. Then, the tracking offset values for region 6, region 10 and region 14 are calculated and stored in the same manner. The operation is repeated until offset values have been calculated and stored for all regions on the optical disk. Thus, the tracking offset values are mapped region by region for the entire optical disk.

Figure 4A:
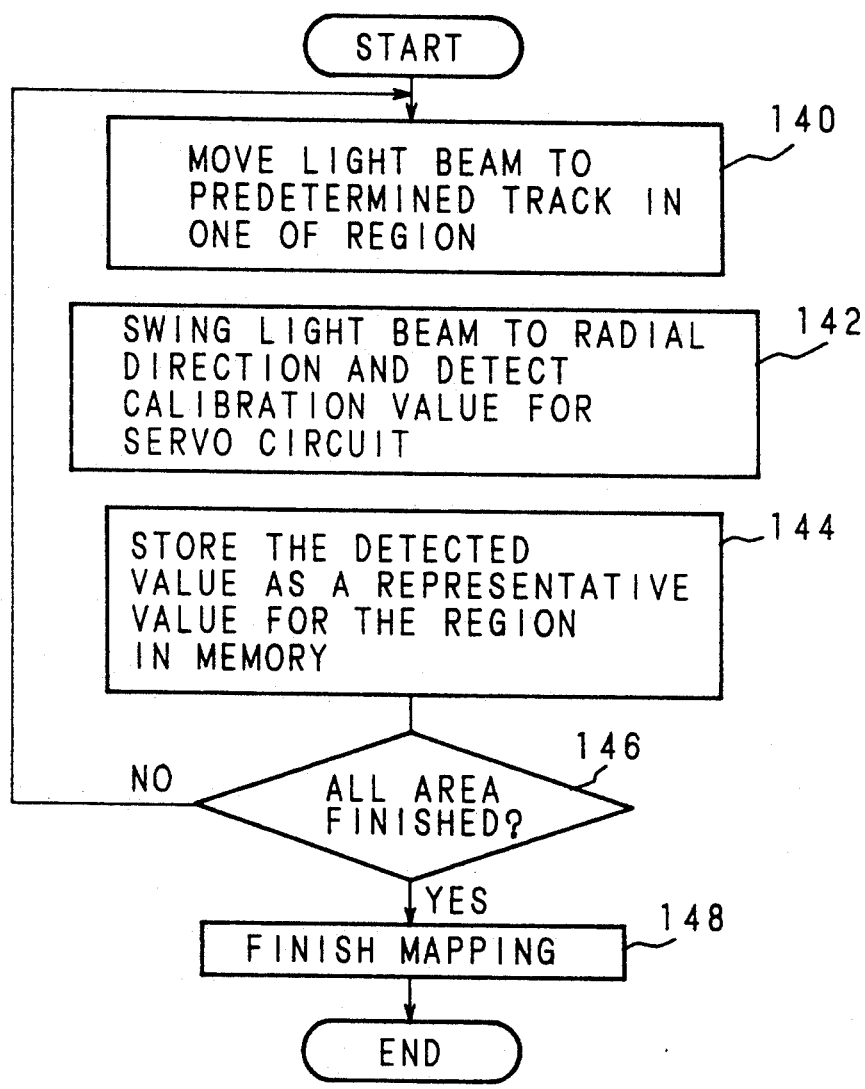
FIG. 4(a) is a flow chart showing a mapping operation in accordance with the present invention.
Figure 4B:
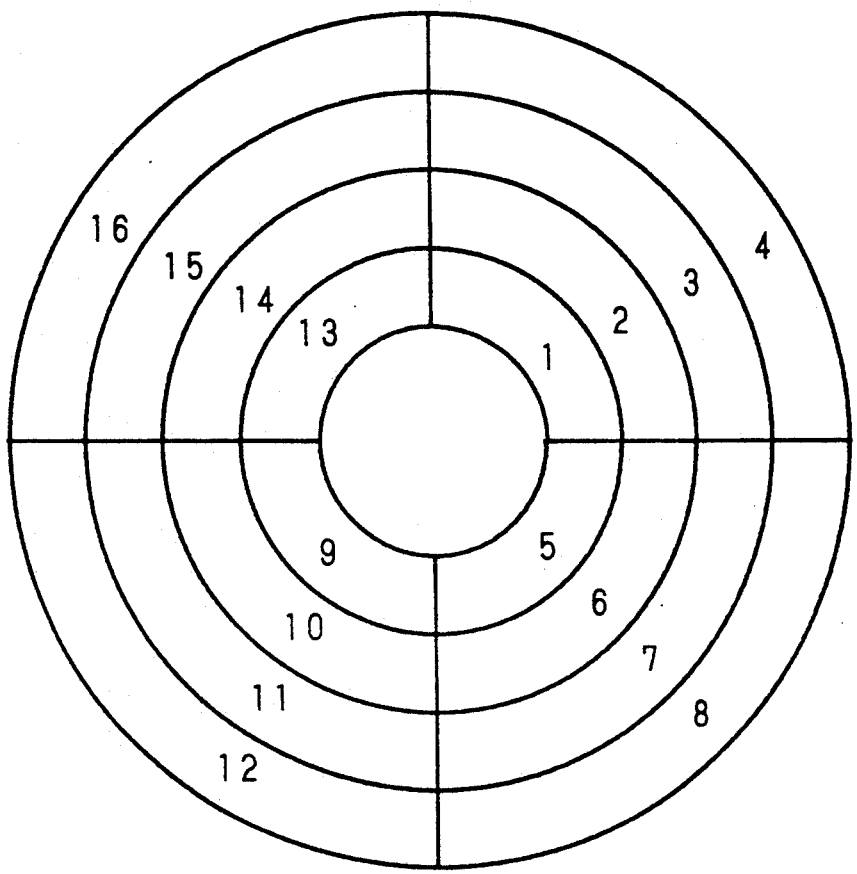
FIG. 4(b) is a schematic diagram showing an optical disk that is divided into regions for mapping.

A flow chart of the overall mapping process is shown in FIG. 4A. Initially, the light beam is moved to a predetermined track in a first region to be mapped in step 140. The beam is then moved in a radial direction across at least one track, and the value of the tracking offset is determined for that region in step 142. In step 144, the detected value of the tracking offset is stored in memory 64 as a value which represents the region. Steps 140, 142 and 144 are repeated for each region of the optical disk until the final region has been completed as determined in step 146. The map is indicated as completed in step 148, and recording and reproduction can be performed. It will be understood that different calibration values in addition to tracking offset can be mapped in accordance with the disclosed technique. The measurement of other calibration values is described in detail hereinafter.

Figure 5:
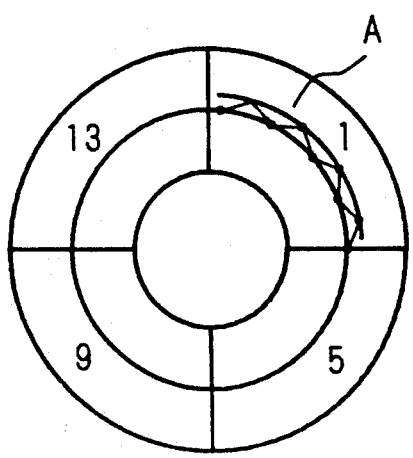
FIG. 5 is a schematic view showing movement of the light beam across a predetermined track for calculating offset in a region of the optical disk.

In the above described mapping technique, any track within each region can be selected as the predetermined track for measuring tracking offset. It is considered that a relatively unbiased offset value is obtained by selecting the center track of each region. As shown in FIG. 5, track A is selected in region 1.

Figure 6:
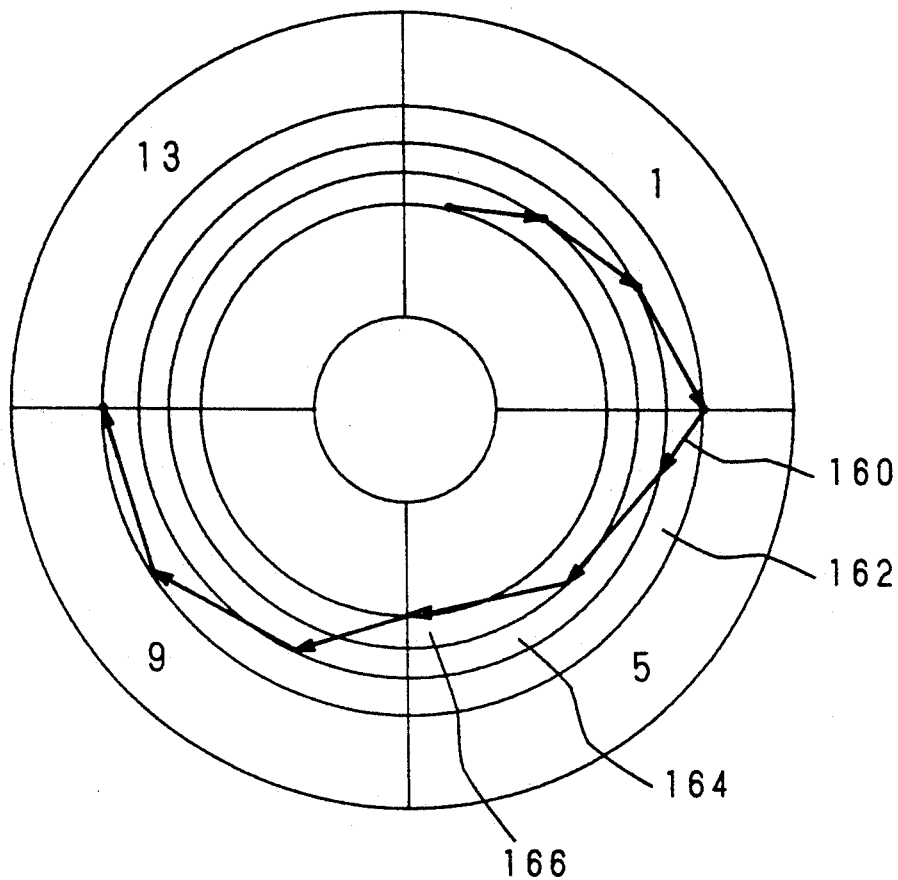
FIG. 6 is a schematic diagram showing track jumping for measuring offset.

In the above described mapping technique, measurement of the tracking offset is performed by movement of the light beam across a predetermined track in each region. An alternative technique is shown in FIG. 6. The microprocessor 62 issues to actuator 48 a track jump command signal which causes a continuous jump across two or more tracks within each region. As shown in FIG. 6, the light beam is caused to follow a path 160 in region 5 which crosses tracks 162, 164 and 166. The maximum and minimum values of the tracking signal are measured as described above for each track that is crossed. The average maximum and the average minimum values are obtained, and the tracking offset is calculated from these values as described above.

By designating regions in the radial direction by track group numbers and regions in the circumferential direction by sector group numbers, the map of the optical disk medium can be expressed by the following matrix.

Map = (number of track groups, number of sector groups)

where the number of track groups $\leq$ than the number of tracks or the maximum number of notches of external scale, and 1≦the number of sector groups≦the number of sectors in the circumferential direction or the number of rotary pulses of the disk drive motor.

Preferably, the number of track groups is 4, 8, 16 or 32 and the number of sector groups is 4, 8, 16 or the number of sectors. When the number of groups is even, the operating speed of the microprocessor is increased. When the number of groups is less than 4, the accurate calibration which is the purpose of the present invention may not be performed fully. When the number of groups is greater than 32, processor overhead time may be increased to an unacceptable value.

Figure 7:
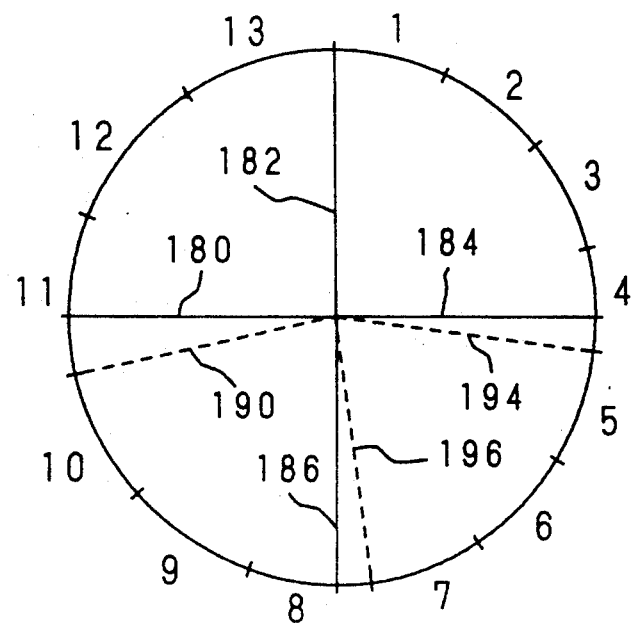
FIG. 7 is a schematic diagram showing the circumferential boundaries of regions for an optical disk having sectors.

In the case wherein the sector address is detected from the reproduced data, the boundary of the sector is taken as the boundary of the mapping region. In the case wherein rotary pulses of the disk drive motor are detected, these pulses are utilized as to define the boundaries of mapping regions in the circumferential direction. A conventional 130 mm optical disk includes 17 sectors (one sector equals 512 bytes) or 31 sectors (one sector equals 1K bytes). A 90 mm optical disk contains 13 or 25 sectors. When the map includes 4 regions in the circumferential direction as shown in FIG. 7, the optical disk is first divided into four equal parts. Thereafter the sector boundaries nearest to the dividing lines are allocated as the boundaries of the mapping regions. Thus, with reference to FIG. 7, the disk is initially divided into four equal parts by lines 180, 182, 184 and 86. The sector boundaries 190, 194 and 196 that are closest to lines 180, 184 and 186, respectively, are selected as the circumferential boundaries for mapping regions.

As described above, tracking signal waveforms generated by one line or n lines of track jump are used to obtain the tracking offset values in each region of the optical disk. Track jumping generates a stable waveform in comparison with the waveform that is generated during seeking as described hereinafter. In addition, the track address is detected during jumping, thereby indicating the measurement location. Thus, the track jumping method permits the tracking offset values to easily be determined.

Figure 8:
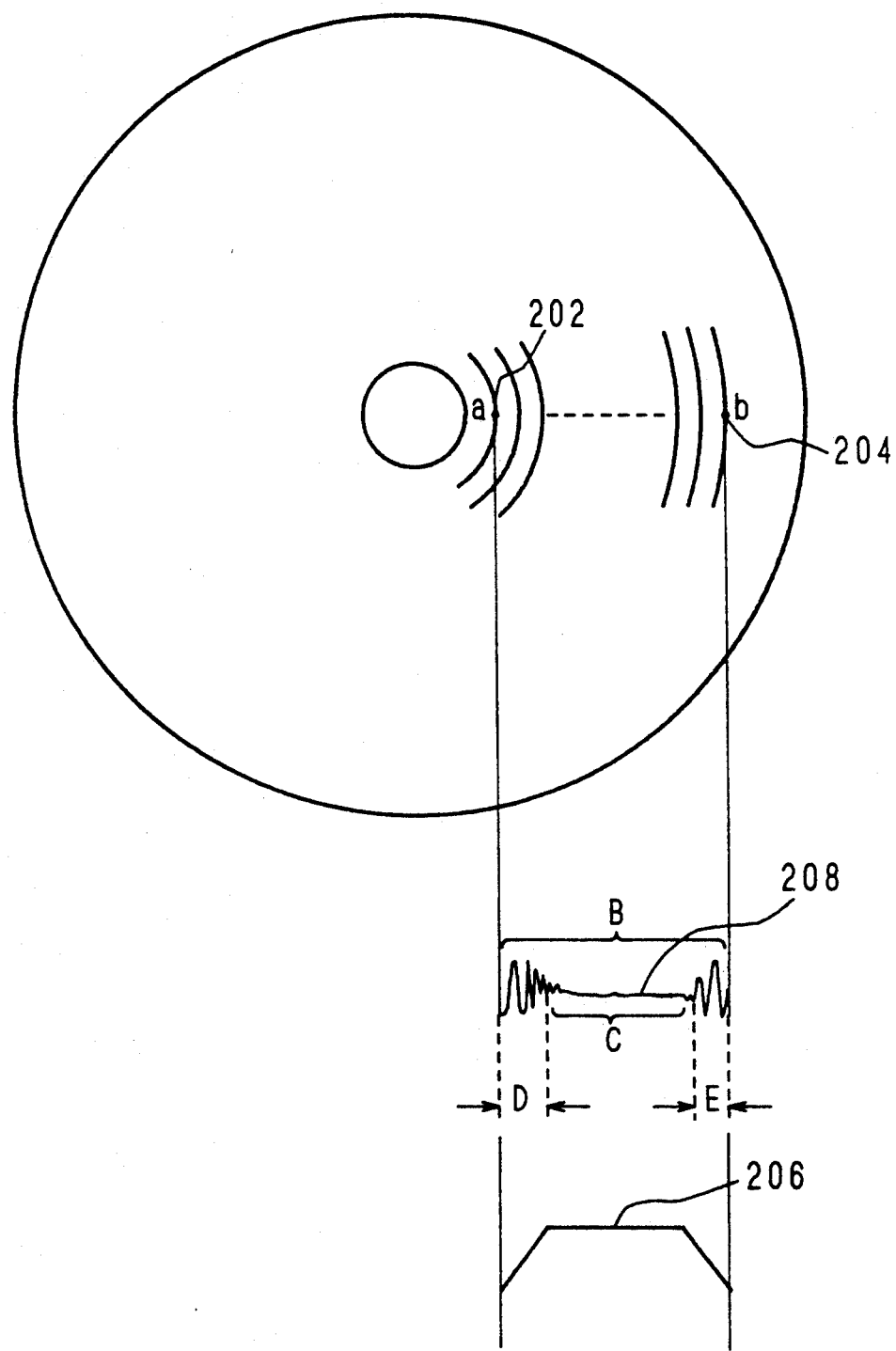
FIG. 8 is a schematic diagram showing measurement of tracking offset during a seek operation.

The track jumping method for measuring and mapping tracking offset values is typically performed when the optical disk is started and before recording and reproduction. Alternatively, the tracking offset values can be obtained at the time of data access during a seek operation. As shown in FIG. 8, when the light beam is moved in a seek operation from a current track 202 to a target track 204 by the linear motor 46 (FIG. 1 , the velocity has a profile as a function of radial position as shown by curve 206. The velocity of the optical head ramps from zero to a constant value and then ramps from the constant value to zero as the target track is approached. The tracking signal varies in frequency during seeking in accordance with the optical head velocity. The tracking signal waveform is shown in FIG. 8 by a waveform 208. During a portion C of the tracking signal 208, the movable optical head portion 16 is moving at high velocity, and the frequency of the tracking signal is too great to be processed by the technique shown in FIG. 1 and described hereinabove. The maximum and minimum values of the tracking signal can be detected near the start of a seek operation during a portion D or near the end of a seek operation during a portion E. During portions D and E, the velocity of the light beam is relatively low. The tracking offset value is determined as described above during portions D and/or E of waveform 208.

The tracking sensor signal obtained during a seek operation is not as stable and easily measured as the signal that is obtained in the track jumping method. Furthermore, in the seeking mode, the number of tracks crossed is counted, but the track address is not detected. Therefore, the location of the measurement is not accurately defined in comparison with the track jumping method. However, measurement of tracking offset during a seek operation has the advantage that mapping is performed simultaneously with data access so that time is saved.

In a further alternative method for measuring tracking offset, track jumping for measuring offset is performed after a seeking operation but during data access. Track jumping is used in connection with the seeking operation to access a desired track. The jumping seek technique extends the data access time somewhat but permits mapping to be performed concurrently with data access.

The optical disk drive can include a status observer system which permits direct access to an arbitrary track on the optical disk by coarse movement by the linear motor 46. The use of a status observer is described in detail in copending application Ser. No. 127,391, filed Dec. 2, 1987 and entitled "Optical Disk Drive Device and Information Storage Device", which is hereby incorporated by reference. The status observer system can be utilized for mapping of tracking offset values. In using this system, the linear motor 46 is driven at a low and constant speed, thereby permitting mapping to be performed faster than in the jumping method and more accurately than in the seeking method.

Figure 9:
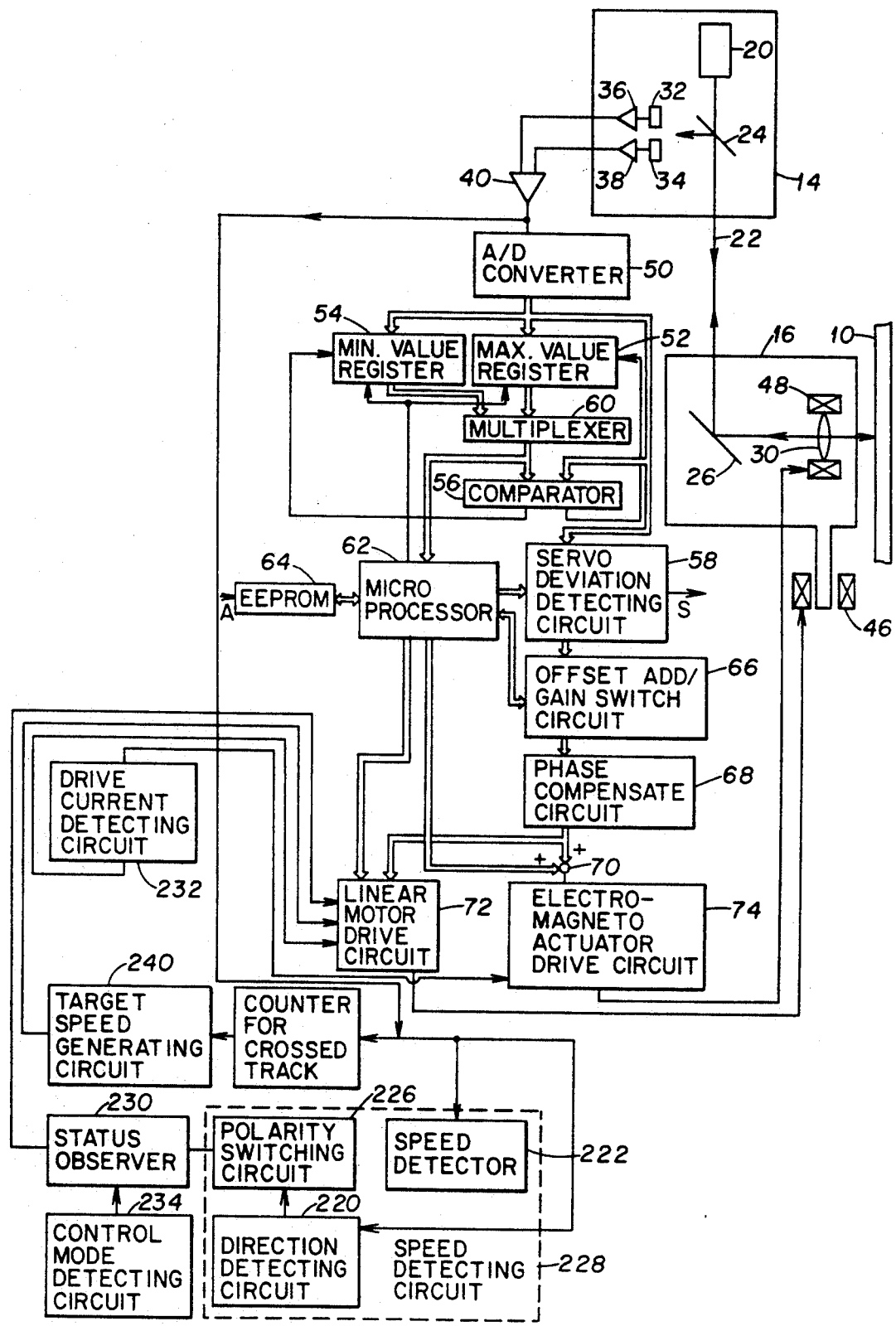
FIG. 9 is a schematic block diagram of an optical disk drive which employs a status observer.
Figure 10:
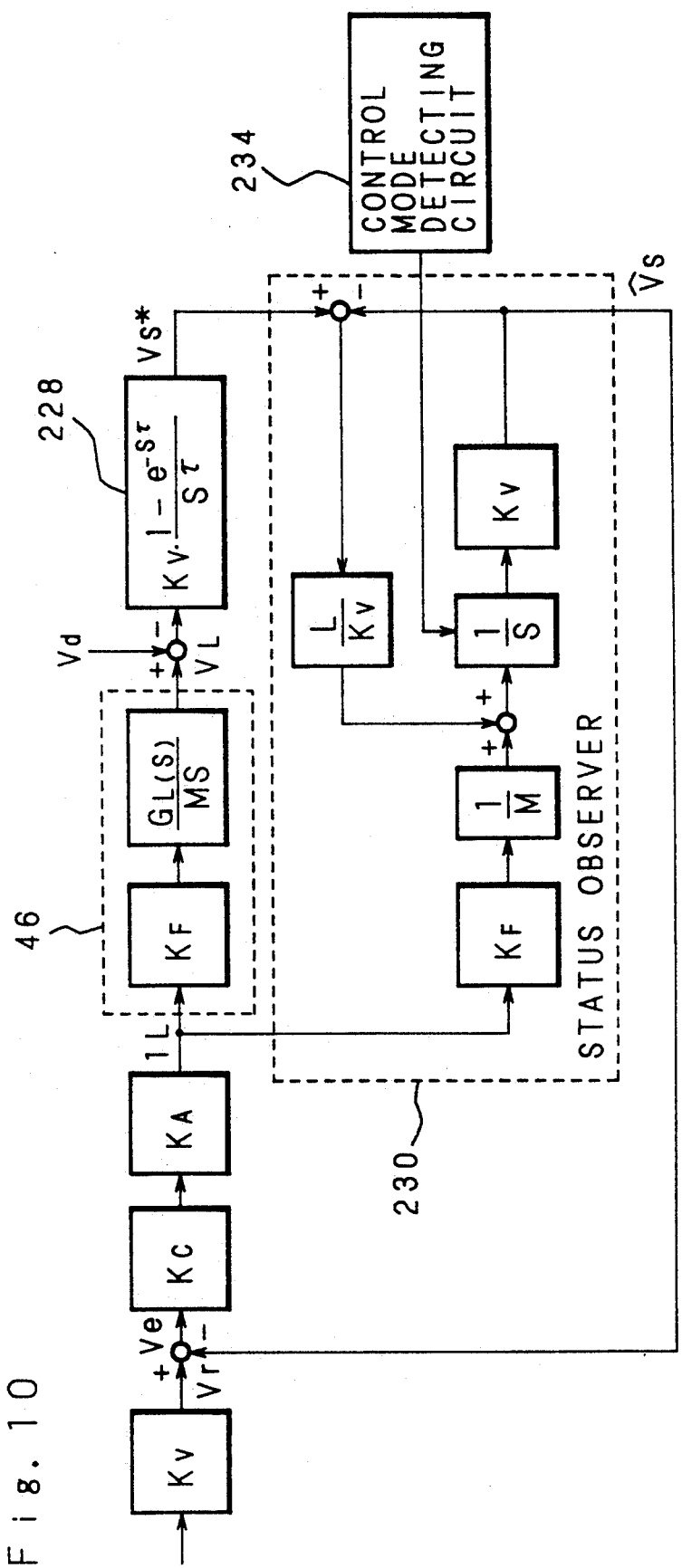
FIG. 10 is an equivalent circuit of the speed controlling system utilized in the optical disk drive of FIG. 9.

A block diagram of an optical disk drive configuration which utilizes a status observer is shown in FIG. 9. Like elements in FIGS. 1 and 9 have the same reference numerals. A direction detection circuit 220 receives the output of differential amplifier 40. The circuit 220 detects the direction in which the light beam is traversing the optical disk. The output of differential amplifier 40 is also connected to the inputs of a speed detector 222 and a counter 224 for detecting the number of tracks crossed. Based on the output of the direction detection circuit 220, a polarity switching circuit 226 converts the output of the speed detector 222 to a positive or negative value. A state determining circuit 230 receives a drive current signal detected by a drive current detection circuit 232, which detects the drive current of the linear motor 48. The state determining circuit 230 also receives the velocity detection signal from the polarity switching circuit 226. On the basis of these signals, the state determining circuit 230 determines a velocity which is close to a required value. An output signal from the state determining circuit 230 is connected to the linear motor drive circuit 72. A control mode detection 234 inhibits operation of the state determining circuit 230 when the light beam is tracking on a predetermining track. An equivalent circuit of FIG. 9 is shown in FIG. 10. Reference is made to the aforementioned application Ser. No. 127,391 for details of operation of the status observer system.

To control the linear motor 46 to maintain a low and constant speed, a pattern of constant speed is selected in a target speed generating circuit 240, and the state determining circuit 230 detects whether or not the speed is controlled according to the desired pattern. When the speed deviates from the desired pattern, an error signal representing the difference between the desired pattern and the detected value is provided to the linear motor drive circuit 72. By controlling the linear motor 46 in this manner, the tracking offset values are measured faster than in the jumping mode and more accurately than in the seeking mode. As a result, more accurate and faster mapping can be performed.

The track jumping method, the seek method, the jumping seek method and the status observer method for tracking offset mapping have been described hereinabove. Mapping can also be performed by a combination of these techniques. For example, all regions of the disk can be mapped by the track jumping method as described above. Thereafter, the tracking offset value of each region is updated by the seek method each time a region is accessed. This technique provides a learning function to update the tracking offset values.

An expression for updating the offset value for a region is as follows.

Updated offset value = $a_1$ · (offset value for a specified region calculated in seeking) + $a_2$ · (offset value for a specified region calculated upon inserting the disk).

where $a_1 + a_2 = 1$.
For example, $a_1 = a_2 = 1/2$;
$a_1 = 1/10, a_2 = 9/10$; or
$a_1 = 1/e, a_2 = (e-1)/e$ can be utilized.

This technique provides a predetermined weighting to the different measured values.

As described above, mapping can be performed when the disk is inserted and when an access operation is performed. In addition, an environmental sensor such as a temperature sensor or a humidity sensor can be mounted in the disk drive. Mapping can be performed when one of the sensors exceeds a predetermined value. Alternatively, mapping can be performed after a predetermined time interval.

Figure 11:
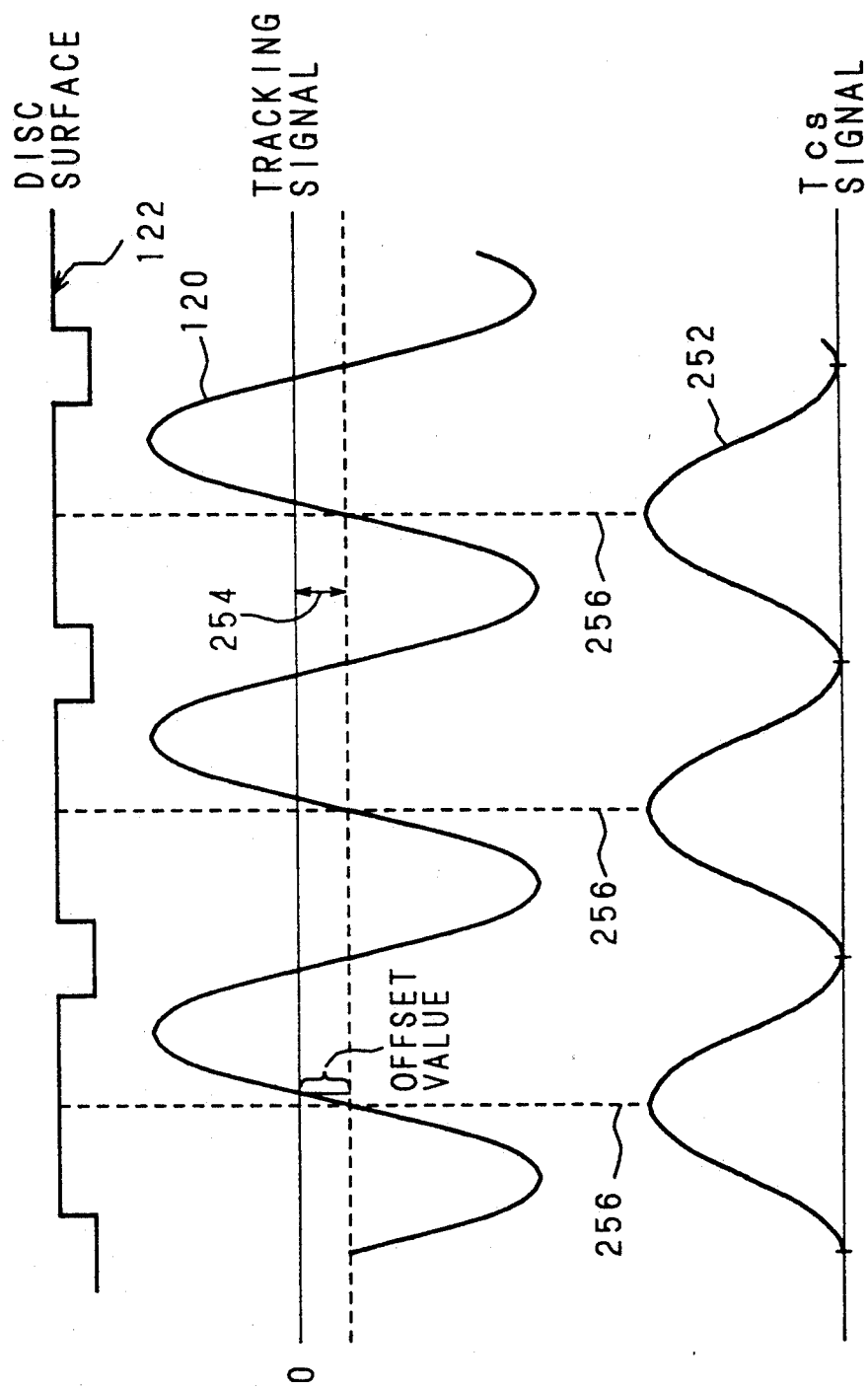
FIG. 11 is a graph showing the relationship between a tracking signal and a track crossing signal as a function of radial position on the disk surface.
Figure 26:
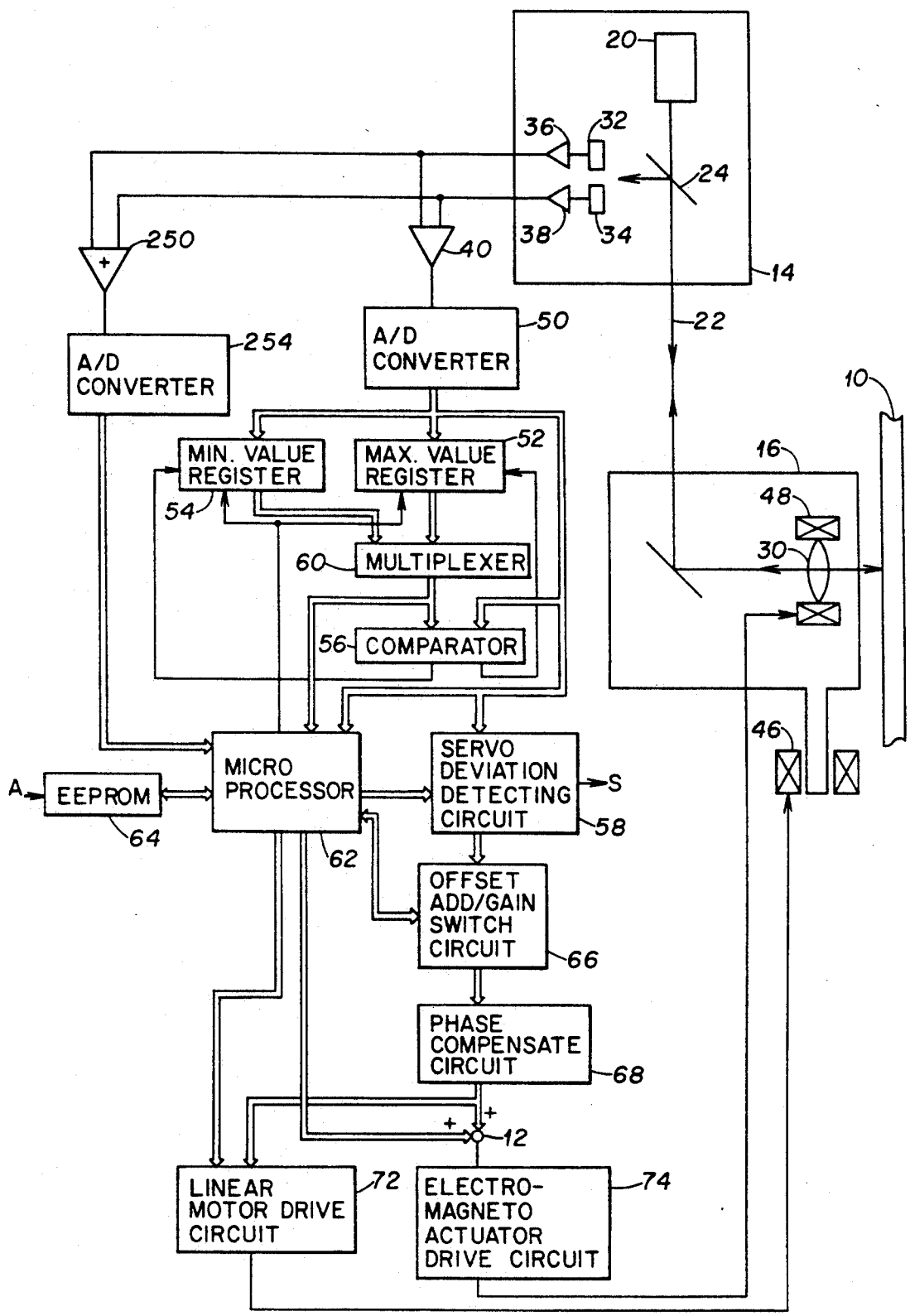
FIG. 26 is a schematic block diagram of an optical disk drive configuration for obtaining tracking offset in accordance with another embodiment of the invention.

An alternative technique for measuring tracking offset is shown in FIGS. 11 and 26. Like elements in FIGS. 1 and 26 have the same reference numerals. The outputs of tracking sensor photodetectors 34 and 36 are coupled through preamplifiers 36 and 38 to the inputs of a summing amplifier 250. The output of summing amplifier 250 is a track cross signal as shown in FIG. 11 by waveform 252. The track cross signal 252 reaches a maximum value when the light beam from the optical head is on the center of a data track. The tracking signal 120 crosses the zero level at the track center if the system is perfectly aligned. However, the difference between the actual value of the tracking signal and the zero level at the time when the track cross signal 252 is maximum represents a tracking offset 254. Referring again to FIG. 26, the output of summing amplifier 250 is digitized by an ADC 254. The digitized track cross signal is connected from ADC 254 to microprocessor 62. The output of ADC 50 is also connected to microprocessor 62. The value of the tracking signal 120 is determined by microprocessor 62 when track cross signal 252 has a maximum value as indicated in FIG. 11 by lines 256. The difference between the measured value of the tracking signal at these points and the zero level represents the tracking offset. Several measurements can be averaged to increase accuracy if desired.

Figure 12:
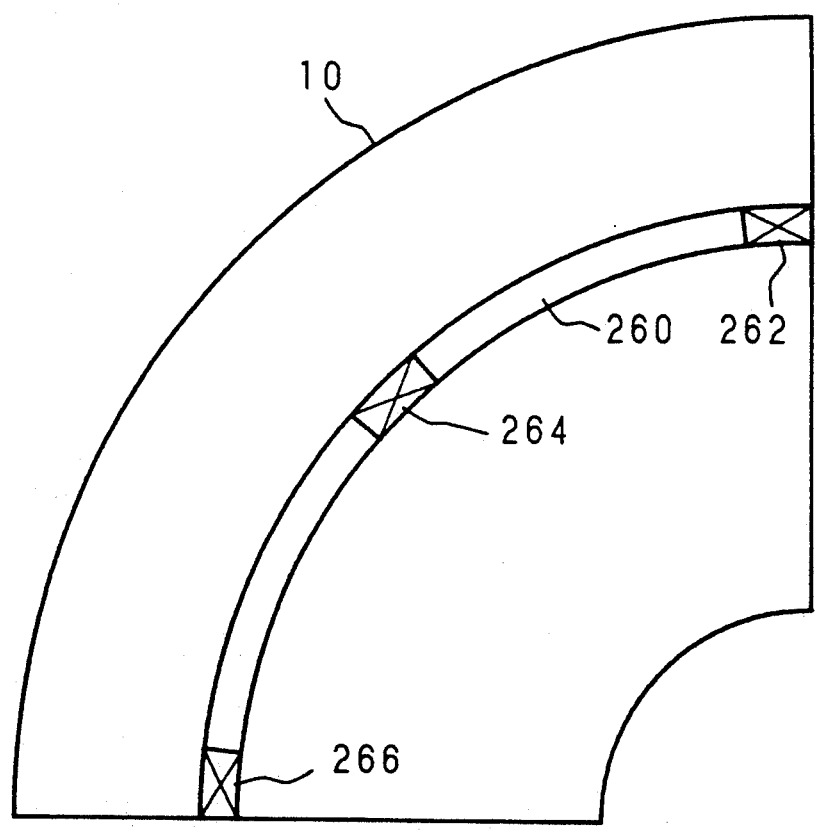
FIG. 12 is schematic diagram showing headers on one track of an optical disk region to be mapped.
Figure 13:
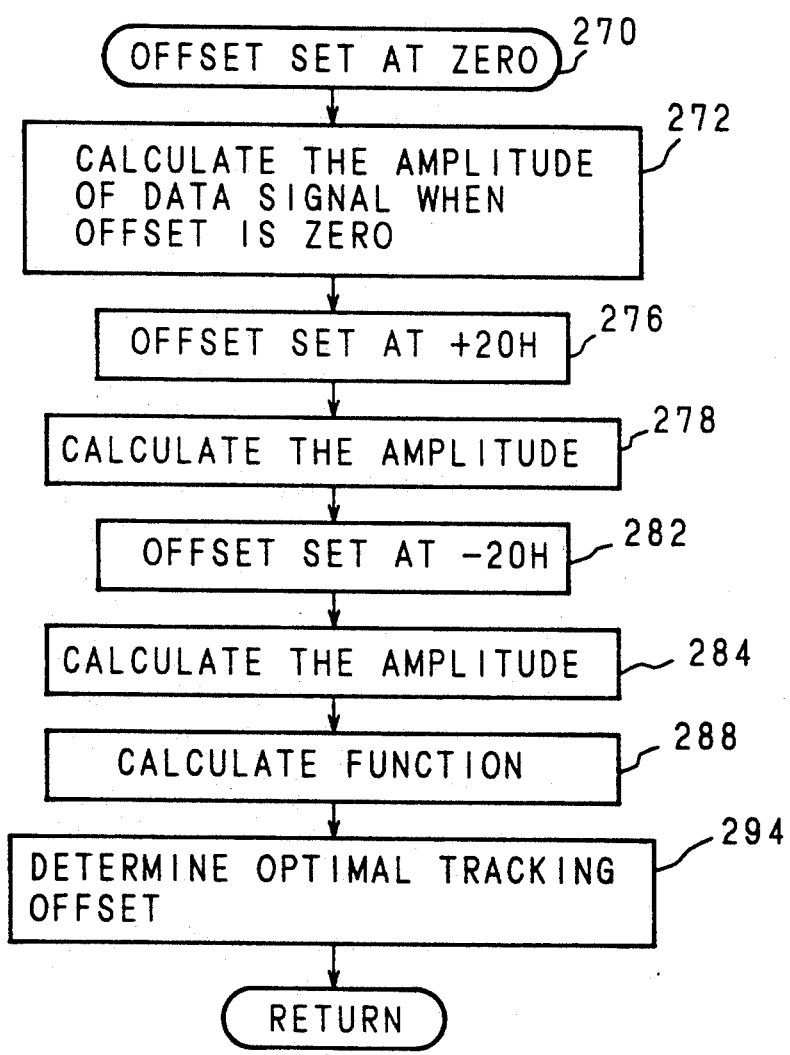
FIG. 13 is a flow chart showing an alternate method of determining tracking offset.
Figure 14:
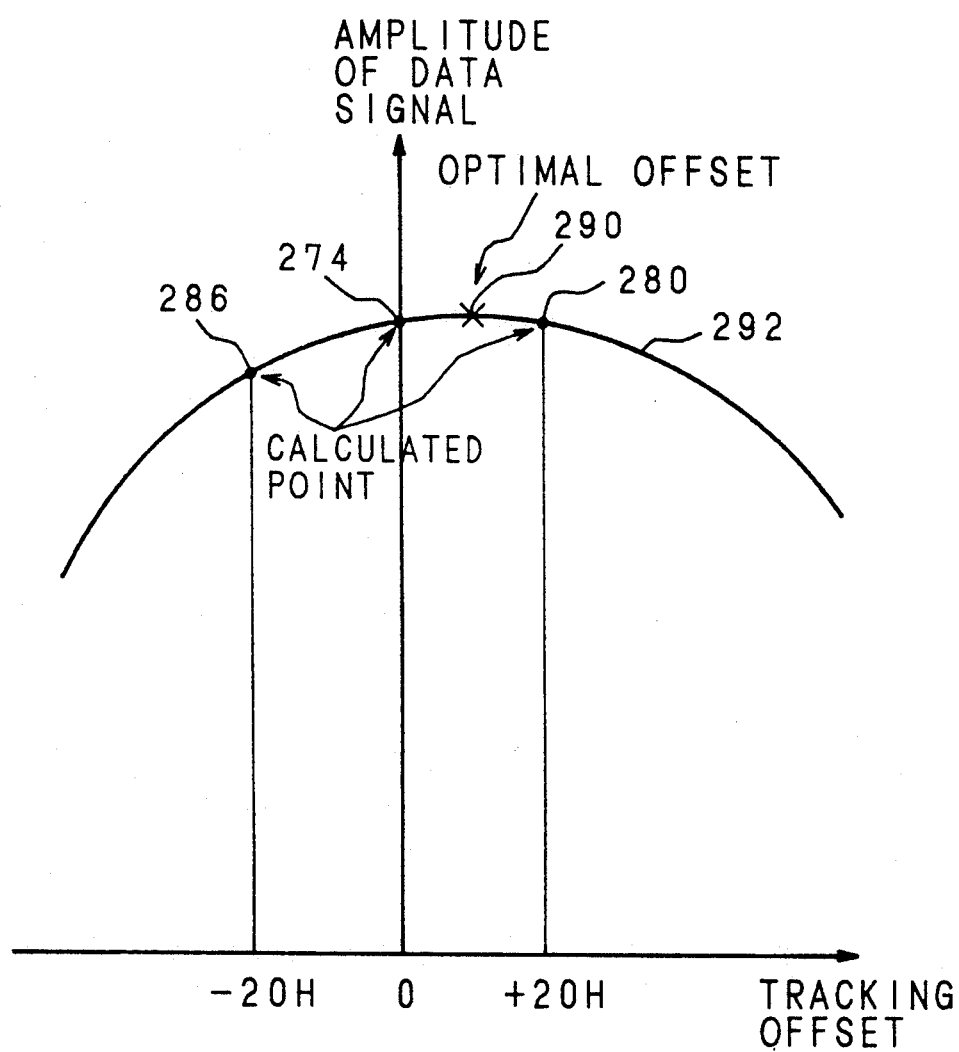
FIG. 14 is a graph showing data signal amplitude as a function of tracking offset and illustrating the method of FIG. 13.

According to another technique for determining tracking offset, the tracking offset which maximizes the amplitude of the reproduced signal of the preformatted part of the header on the optical disk is determined. As shown in FIG. 12, a predetermined track 260 in a selected region of optical disk 10 includes headers 262, 264 and 266. The headers 262, 264 and 266 can be detected in the reproduced data signal by conventional means (not shown). A flow chart of the offset measurement process is shown in FIG. 13. When the headers 262, 264 and 266 are detected, the microprocessor 62 supplies a predetermined offset to the offset add/gain switch circuit 66. The amplitude of the data signal is measured for each different offset value as shown in FIG. 14.

Initially, when header 262 is detected, the offset is set at zero, as shown in step 270 of FIG. 13, and the amplitude of the data signal is measured, as shown in step 272. The measured value corresponds to point 274 in FIG. 14. Next, when the header 264 is detected, the microprocessor 62 provides an offset of 0+20H to offset add/gain switch circuit 66, as shown in step 276. The light beam is moved by the actuator 48 by an offset of 0+20H, and the amplitude of the data signal is measured in step 278. The measured data signal is shown in FIG. 14 as point 280. Next, when the header 266 is detected, the microprocessor 62 provides an offset of 0−20H to offset add/gain switch circuit 66, causing the light beam to be shifted in the opposite direction, as shown in step 282. The amplitude of the data signal is measured in step 284. The data signal corresponding to an offset of 0−20H is shown as point 286 in FIG. 14.

Using the coordinates of the points 274, 280 and 284, a function 292 expressing a relation between the amount of offset and the amplitude of the data signal is calculated. The function 292 is approximated as an upwardly convex quadratic function and is determined from the coordinates of the points 274, 280 and 284 using conventional curve fitting techniques, as shown in step 288. The optimal value of the tracking offset is the offset corresponding to a point 290 on function 292 with the maximum data signal amplitude. The microprocessor 62 calculates the point on function 292 at which the slope is zero. The offset at point 290 is the optimal tracking offset and is stored by the microprocessor 62 in memory 64, as shown in step 294. This procedure is repeated for each region of optical disk 10 to thereby complete mapping of tracking offset values for each region.

As described above, this embodiment utilizes measurement of header signal amplitude. This technique can also be implemented by measurement of preformatted data or recorded data. However, in this mode, the accuracy is somewhat reduced.

Another technique for measuring the tracking offset value can be utilized in the case where the driving current for the actuator 48 is controlled by a push/pull circuit. Referring again to FIG. 1, the microprocessor 62 provides a track jump command signal to the adder 70, and the maximum value and the minimum value of the tracking signal at the output of differential amplifier 40 are measured as described hereinabove. Next, the driving current for actuator 48 is changed by adding a different DC component to the voltage supplied to drive circuit 74, and the maximum and minimum values of the tracking signal are again measured.

Figure 15:
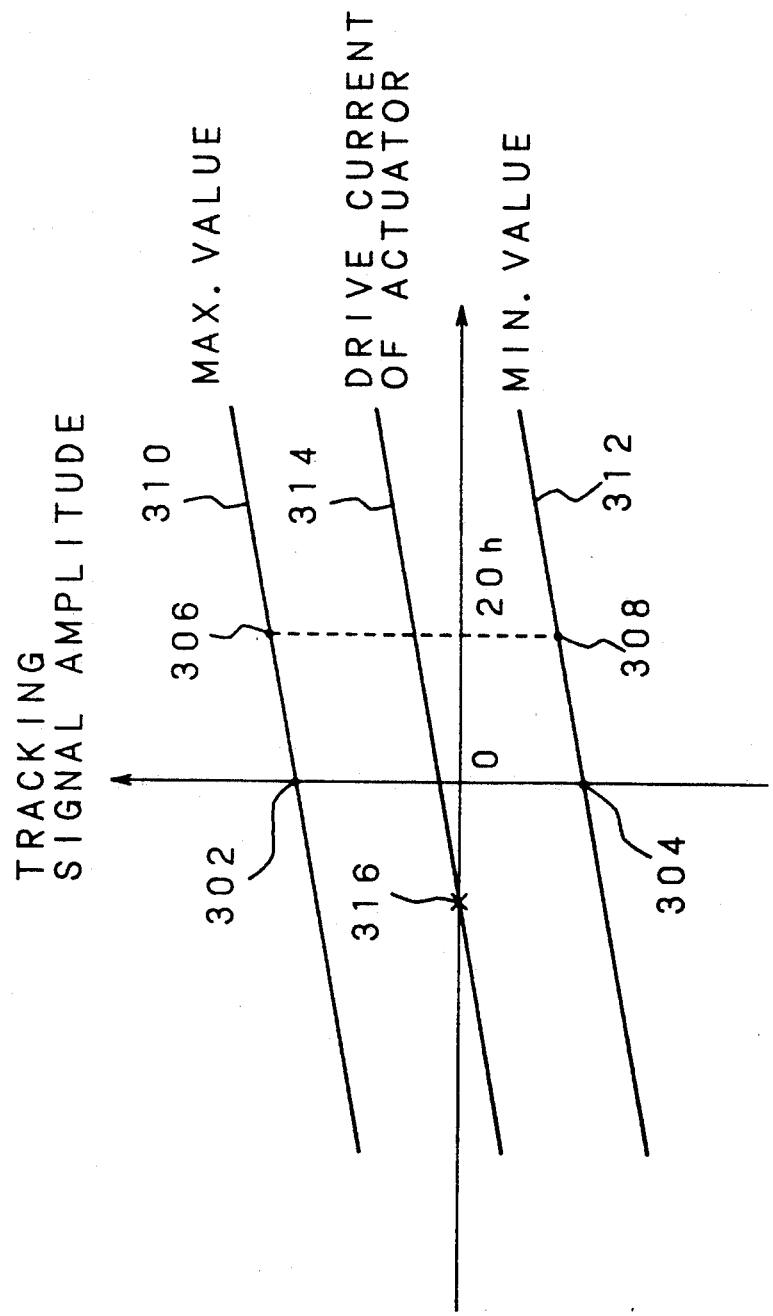
FIG. 15 is a graph showing the tracking signal as a function of actuator drive current.

In FIG. 15, the maximum values and the minimum values of the tracking signal are plotted as a function of actuator drive current. The maximum and minimum values of the tracking signal for an actuator drive current of zero are indicated at points 302 and 304, respectively. The maximum and minimum values of the tracking signal for an actuator drive current of 20H are shown by points 306 and 308, respectively. A straight line 310 is drawn through points 302 and 306, and a straight line 312 is drawn through points 304 and 308. A straight line 314 is also is drawn midway between lines 310 and 312. The point of intersection 316 between line 314 and the horizontal axis (tracking signal=0) is determined as the optimum value of the drive current. When a DC current equivalent to point 316 is supplied to the drive circuit 74, the positive and negative amplitudes of the tracking signal become equal, and the tracking offset is zero. Thus, the light beam accurately traces the center of the track. In this case, the required actuator drive current is mapped in place of the offset value.

The offset values for performing tracking for each region of the optical disk are mapped according to one of the above techniques and are stored in memory 64. When the disk drive is tracking on the optical disk for recording or reproduction, the mapped offset value for the region being tracked is provided by microprocessor 62 to offset add/gain switch circuit 66. The circuit 66 adjusts the digitized tracking signal to have zero offset. The adjusted tracking signal is inputted to the phase compensation circuit 68, and phase compensation and coupling compensation are performed. Then, data for driving the actuator 48 is provided to the adder 70, and data for driving the linear motor 46 is provided to the linear motor drive circuit 72. As the optical head moves to different regions of the optical disk, the mapped offset values are changed in accordance with the values stored in memory 64, and the tracking signals are adjusted accordingly. As a result, tracking servo control is performed with an accurate and calibrated tracking signal, and the light beam tracks on the center of the desired track.

In FIG. 1, the ADC 50 is connected to the output of differential amplifier 40, and the registers 52 and 54 are connected to the output of ADC 50. In an alternate embodiment shown in FIG. IB, the output of differential amplifier 40 is connected to the inputs of analog peak detecting circuits 106 and 108. The outputs of peak detecting circuits 106 and 108 are coupled to two inputs of an analog switching circuit 10, respectively. The output of differential amplifier 40 is connected to a third input of analog switching circuit 110. The output of analog switching circuit 110 is connected to the input of ADC 50. The output of ADC 50 is connected to microprocessor 62 and to servo deviation detecting circuit 58. The state of switching circuit 110 is controlled by microprocessor 62. The peak detecting circuits 106 and 108 detect the maximum and minimum values, respectively, of the tracking signal. The maximum and minimum values are converted to digital form by ADC 50 and are supplied to microprocessor 62 for determination of the tracking offset value as describe hereinabove.

Thus far, various techniques for mapping the tracking offset value in different regions of the optical disk have been described. In accordance with the present invention, other calibration values such as sensor gain, threshold value, focus offset and the like can be mapped as described hereinafter.

The sensor gain of the tracking servo system can be mapped for each region of the optical disk, such as regions 1-16 shown in FIG. 4. The maximum value and the minimum value of the tracking signal at the output of differential amplifier 40 are determined as described above. Then the microprocessor 62 calculates the amplitude of the tracking signal from the maximum and minimum values. The sensor gain which maintains the tracking signal amplitude constant at a predetermined value is stored in memory 64 for each region of the optical disk. In subsequent tracking, the sensor gain is adjusted according to the values stored in memory 64 by providing a sensor in control signal to offset add/gain switch circuit 66.

Figure 16:
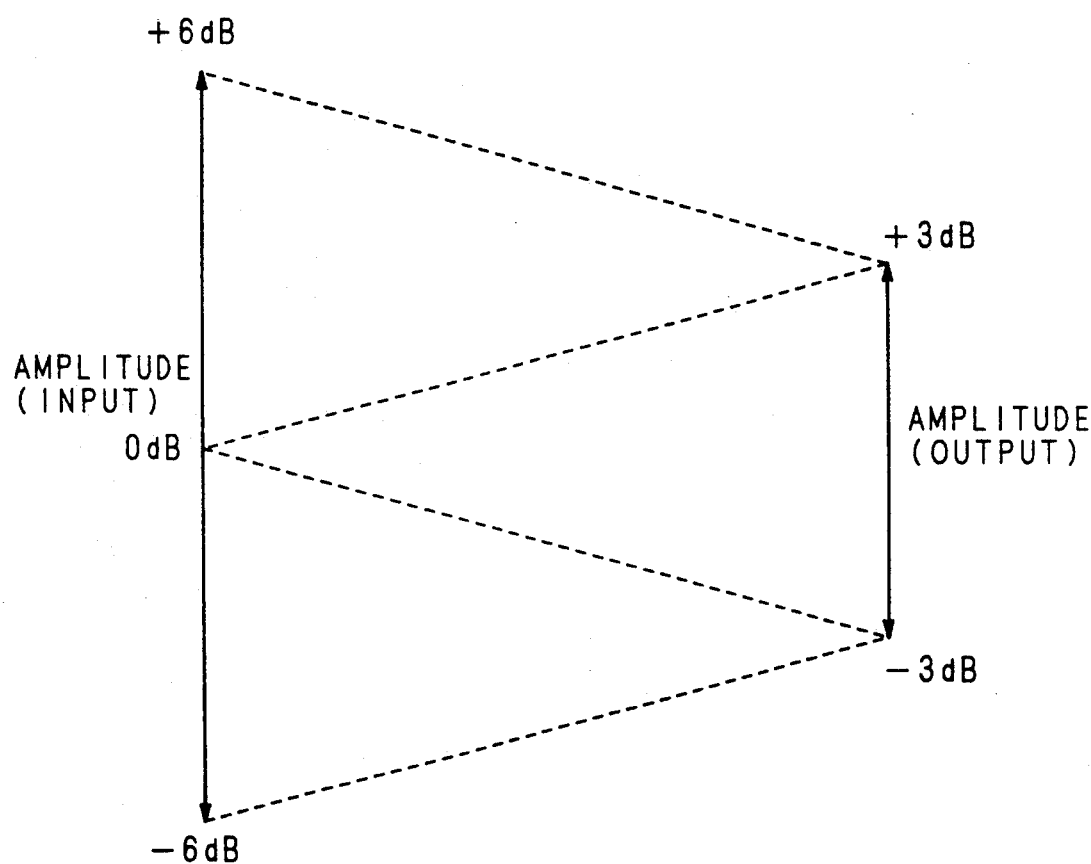
FIG. 16 is a schematic diagram showing changing of sensor gain.

By way of example, FIG. 16 shows the amplitude of the tracking signal having a large dynamic range on the left and shows the amplitude having a small dynamic range after adjusting the sensor gain on the right side. For an input amplitude of −6dB to +6dB with respect to a standard amplitude, the gain is set to +3dB for the input of 6dB to 0dB, and the gain is set to −3dB for the input of 0db to +6dB. Thus, after changing the sensor gain, the amplitude of the tracking signal falls within the range of −3dB to +3dB with respect to the standard amplitude. Information that the sensing gain is set to +3dB for the input of −6dB to 0dB and is set to −3dB for the input of 0dB to +6dB is mapped in each region of the optical disk. The control of gain can be performed by a plurality of selectable attenuators. Where a more precise gain adjustment is required, an 8 bit multiplying D/A converter can be utilized to provide $2^8$ steps.

A servo deviation threshold value is used to determine when the light beam has deviated by more than a predetermined distance from the center of the desired track during tracking. Since deviation from the desired track may destroy data on adjacent tracks or cause reproduction of incorrect data, recording or reproduction are typically interrupted when the servo deviation threshold is exceeded.

In determining the threshold value, the maximum value and the minimum value of the tracking signal at the output of differential amplifier 40 are determined as described hereinabove. The microprocessor 62 calculates the amplitude of the tracking signal from the maximum and minimum values. Then positive and negative threshold values are determined as a predetermined fraction of the peak-to peak amplitude of the tracking signal. The threshold values for each region are stored in the memory 64. Typically, the threshold levels are determined in accordance with the following equation.

$$+/-Th = +/- \tfrac{1}{4}(V_{max}-V_{min}) + \tfrac{1}{4}(V_{max}+V_{min})$$

where $V_{max}$ represents the average maximum value of the tracking signal and $V_{min}$ represents the average minimum value of the tracking signal.

The threshold values calculated in this manner correspond to a deviation from the track center of +/−0.15 micrometer for tracks having a width of 1.6 micrometers. It will be understood that different threshold values can be selected depending on the allowable deviation.

In tracking, the threshold values are supplied to the servo deviation detection circuit 58. The servo deviation detection circuit 58 compares the output of ADC 50 with the threshold values Th. When the output of the ADC 50 exceeds either the positive or negative threshold value Th, an error processing command signal S is generated. The signal S indicates that an out of servo condition has occurred and can be used, for example, to interrupt the recording operation. When the output of ADC 50 does not exceed the threshold value Th, the output of ADC 50 is supplied directly to the offset add/gain switch circuit 66.

Figure 17A:
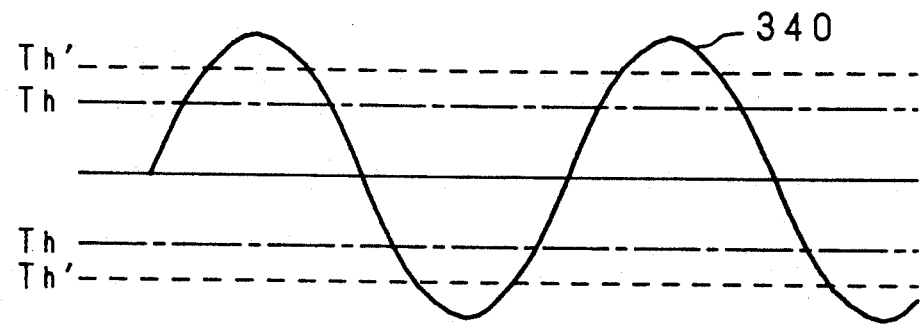
FIGS. 17(a)–17(c) are graphs showing the tracking signal as a function of radial position and comparing a fixed threshold in accordance with the prior art and a variable threshold in accordance with the present invention.
Figure 17B:
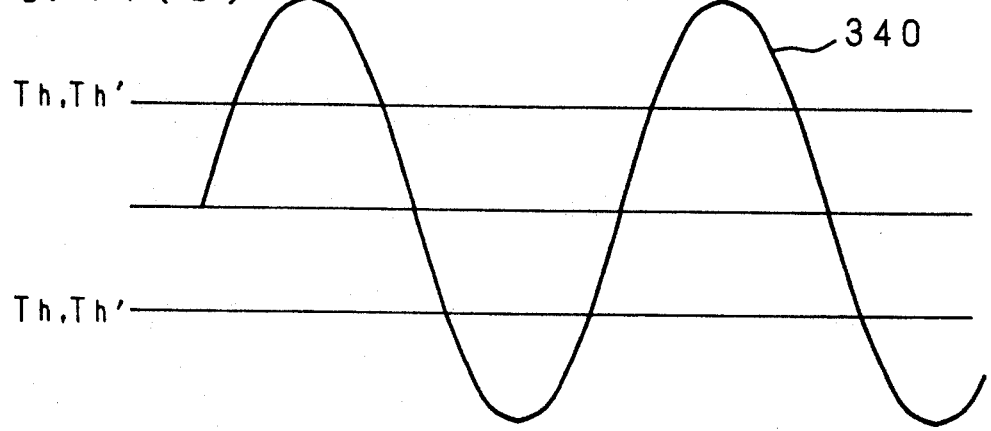
Figure 17C:
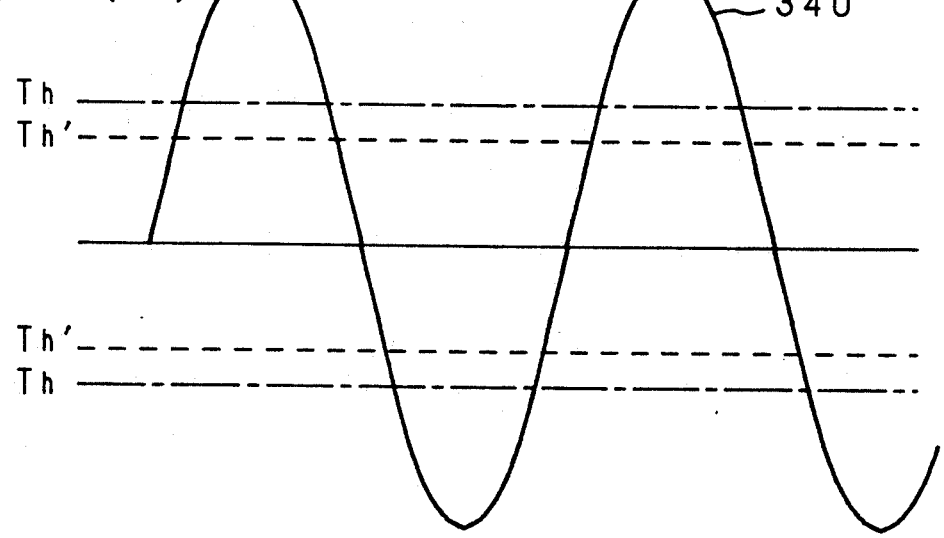

Since the threshold value Th for each region of the optical disk is calculated from the maximum and minimum values of the tracking signal, the threshold value varies in accordance with the amplitude of the tracking signal. The improved operation obtained thereby is illustrated in FIGS. 17A-17C Fixed threshold values Th' in accordance with the prior art are compared with variable threshold values Th in accordance with the present invention. In FIG. 17B, the tracking signal 340 has a normal amplitude, and the fixed threshold value Th' and the variable threshold value Th are the same. An out of servo condition is indicated when the tracking signal 340 exceeds the threshold value Th or the threshold value Th'.

In FIG. 17A, the amplitude of the tracking signal 340 is reduced in amplitude. The variable threshold value Th is reduced by an amount corresponding to the reduced amplitude tracking signal. Thus, an out-of servo condition is indicated when the light beam deviates from the center of the predetermined track by the same predetermined distance as in FIG. 17B. However, in the case of the fixed threshold value Th', an out-of servo condition is detected only after the light beam has deviated from the track center by a distance larger than the predetermined distance. If the amplitude of the tracking signal 340 decreases sufficiently, an out of-servo condition cannot be detected.

In FIG. 17C, the amplitude of the tracking signal 340 has increased, and the variable threshold value Th has increased by a corresponding amount. Thus, an out-of servo condition is indicated when the light beam deviates from the track center by the same predetermined distance. In the case of the fixed threshold value Th', an out-of servo condition is detected even when the light beam remains within the normal range of tracking. Thus, the variable threshold value Th in accordance with the present invention provides more stable operation than the prior art fixed threshold value Th'.

Figure 18:
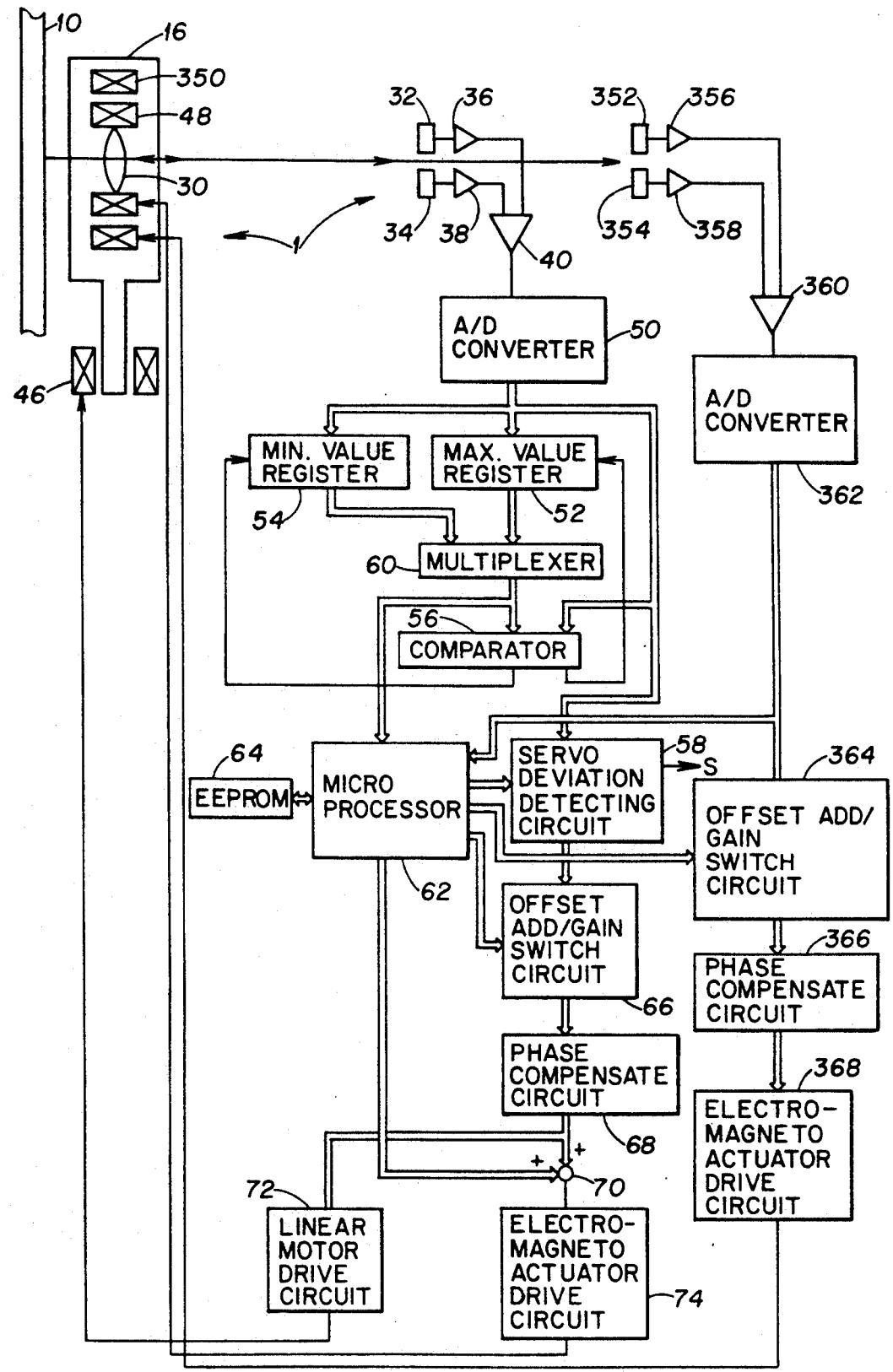
FIG. 18 is a schematic block diagram of an optical disk drive configuration for mapping focus offset.
Figure 19:
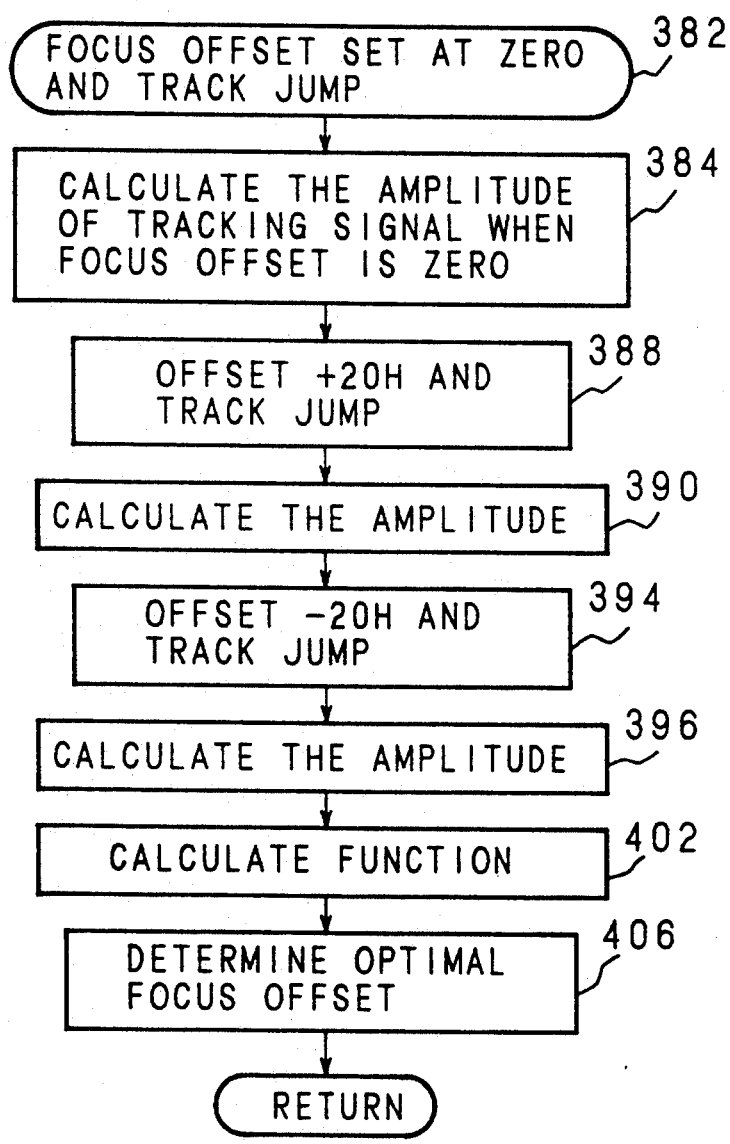
FIG. 19 is a flow chart showing operation of the configuration of FIG. 18.
Figure 20:
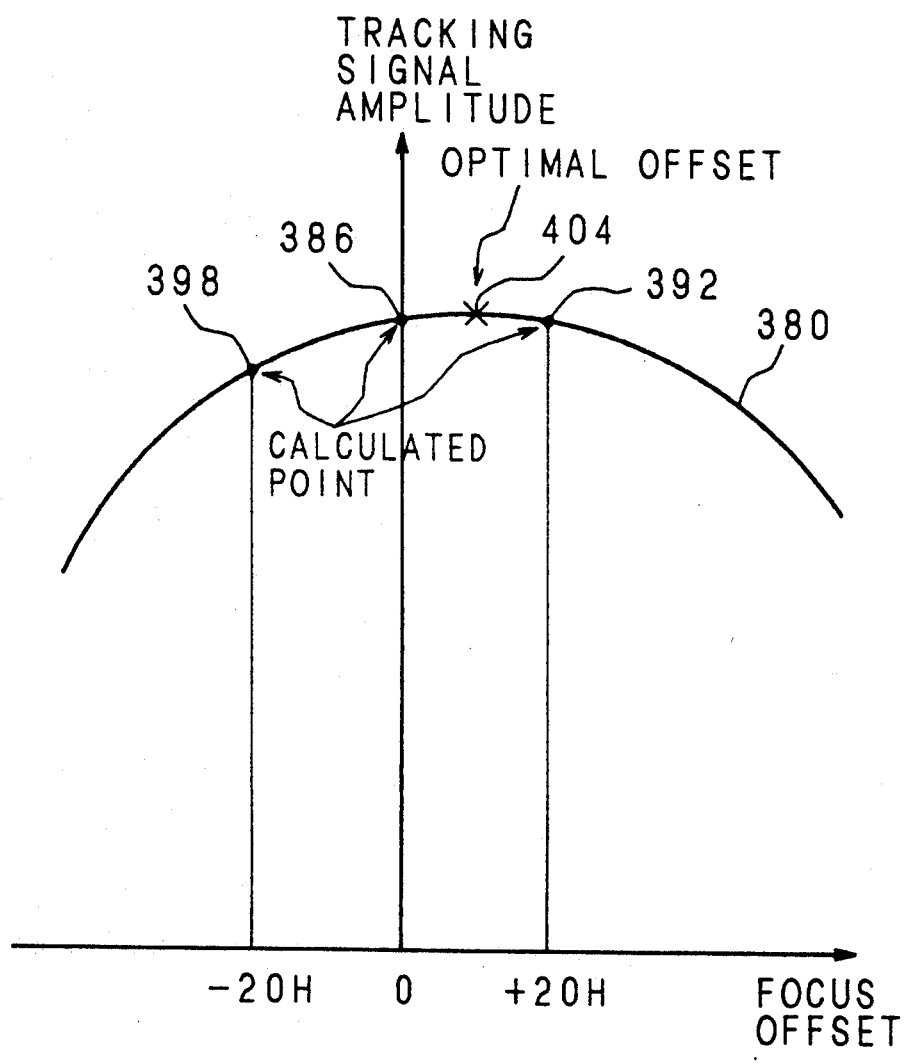
FIG. 20 is a graph of tracking signal amplitude as a function of focus offset illustrating the determination of optimum offset.

Focus offset is a focus error which occurs even though a focus servo circuit detects an in focus condition. A block diagram of an optical disk drive configuration for mapping and correcting focus offset for each region of an optical disk is shown in FIG. 18. Like elements in FIGS. 1 and 18 have the same reference numerals. A focus control electromagnetic actuator 350 is mounted on movable optical head portion 16 so as to move objective lens 30 along the optical axis and thereby vary focus. A focus sensor can, for example, be a knife edge type focus sensor as known in the art. The focus sensor includes focus sensor photodetectors 352 and 354. The outputs of photodetectors 352 and 354 are coupled through preamplifiers 356 and 358, respectively, to the inputs of a differential amplifier 360. The output of differential amplifier 360 is digitized by an ADC 362. The digitized output of ADC 362 is connected to an offset add/gain switch circuit 364 and to the microprocessor 62. The output of offset add/gain switch circuit 364 is coupled through a phase compensation circuit 366 and an electromagnetic actuator drive circuit 368 to the actuator 350. The offset add/gain switch circuit 364 is controlled by an output of the microprocessor 62. The determination of focus offset in this embodiment is based on the fact that the tracking signal at the output of differential amplifier 40 has a maximum amplitude when the optical system is exactly focused and has a smaller amplitude when the optical system is out of focus. A curve 380 in FIG. 20 indicates the tracking signal amplitude as a function of focus offset. A flow chart of the procedure followed by the system of FIG. 18 for determining focus offset is shown in FIG. 19.

Initially, the microprocessor 62 provides a focus offset of 0 to the offset add/gain switch circuit 364 and provides a track jump command signal to adder 70 in step 382 such that the light beam moves or jumps across one or more tracks of the optical disk. As the light beam moves across the track, the maximum value and the minimum value of the tracking signal at the output of differential amplifier 40 are measured as described hereinabove, in step 384. The measured value corresponds to point 386 in FIG. 20. Next, the microprocessor 62 provides an offset of 0+20H to offset add/gain switch circuit 364 and issues another track jump command signal to adder 70 in step 388. The amplitude of the tracking signal at the output of differential amplifier 40 is again measured in step 390. The measured value corresponds to point 392 in FIG. 20. Next, the microprocessor 62 provides an offset of 0−20H to offset add/gain switch circuit 364 and provides a track jump command signal to adder 70 in step 394. The amplitude of the tracking signal at the output of differential amplifier 40 is measured in step 396. The measured value corresponds to point 398 in FIG. 20.

A curve 380 which passes through points 386, 392 and 398 is approximated by an upwardly convex quadratic function. The microprocessor 62 determines the quadratic function in step 402 from the coordinates of points 386, 392 and 398 in accordance with well known curve fitting procedures. The microprocessor 62 then determines a point 404 on curve 380 where the tracking signal amplitude is maximum. The maximum is determined as the point where the slope of curve 380 is 0. The focus offset at point 404 is the optimal focus offset value. This value is stored by the microprocessor 62 in memory 64 in step 406. The above procedure for determining focus offset is repeated for each region of the optical disk to provide a map of focus offset for the optical disk.

Subsequently, the focus offset values are used for focus control during operation of the optical disk. As the optical head is tracking on the optical disk, the stored focus offset value in the memory 64 is provided by the microprocessor 62 to the offset add/gain switch circuit 364. The focus offset value is added to the output of ADC 362 so as to provide a corrected focus control signal through phase compensation circuit 366 to actuator drive circuit 368. The actuator 350 performs focus control of objective lens 30.

The tracking control signal used for detection of focus offset as described above is the difference between the signals detected by photodetectors 32 and 34. When the objective lens 30 moves in the direction of tracking, the light incident on the photodetector also moves, and an error is thereby superposed on the tracking signal. The amplitude of the tracking signal is changed by a focus deviation due to an astigmatic difference, and an error is generated in the measured values. Thus, there is a possibility of error in the measured focus offset.

Figure 21:
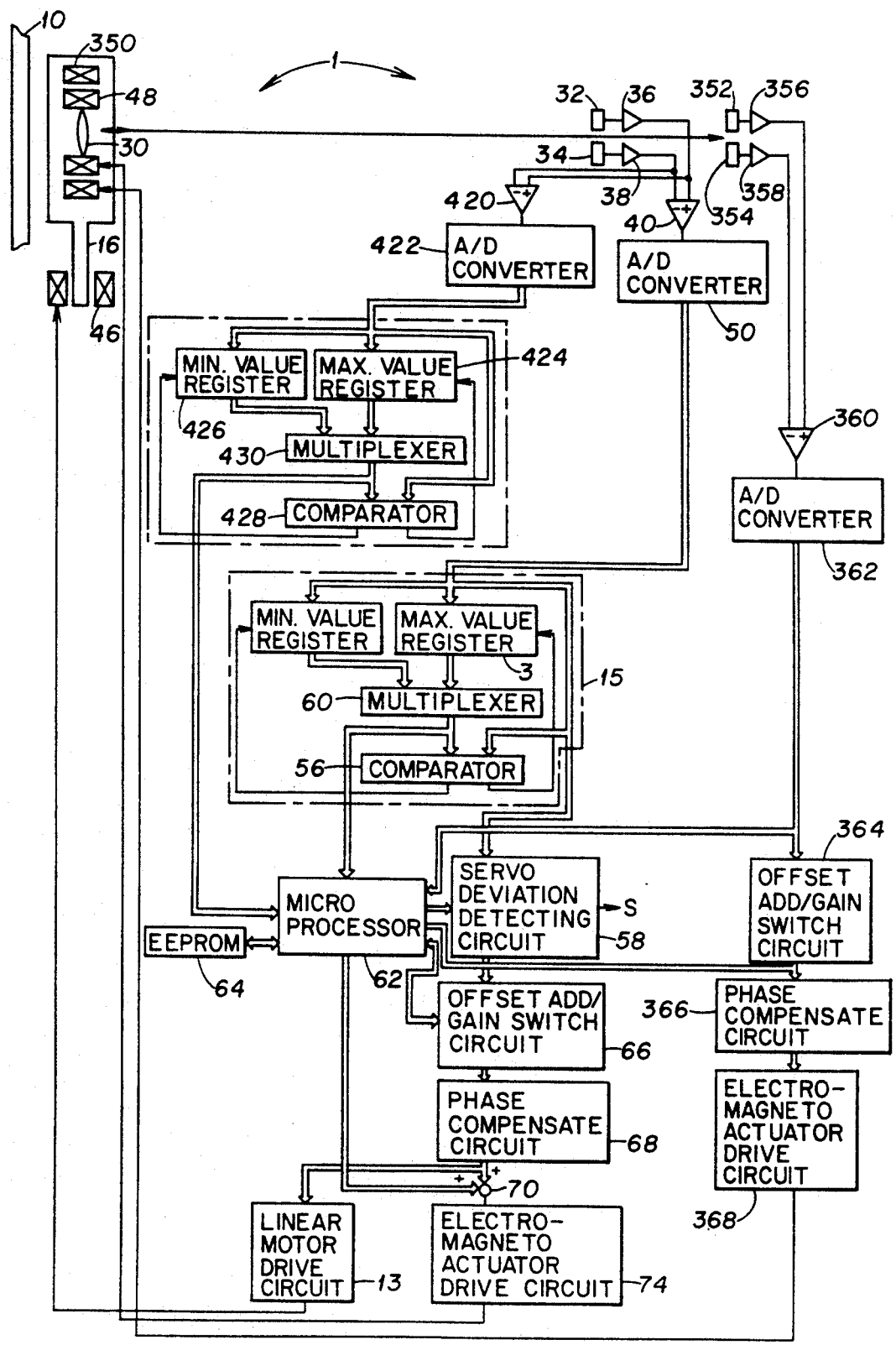
FIG. 21 is a schematic block diagram of an optical disk drive configuration for mapping focus offset in accordance with another embodiment of the invention.
Figure 22:
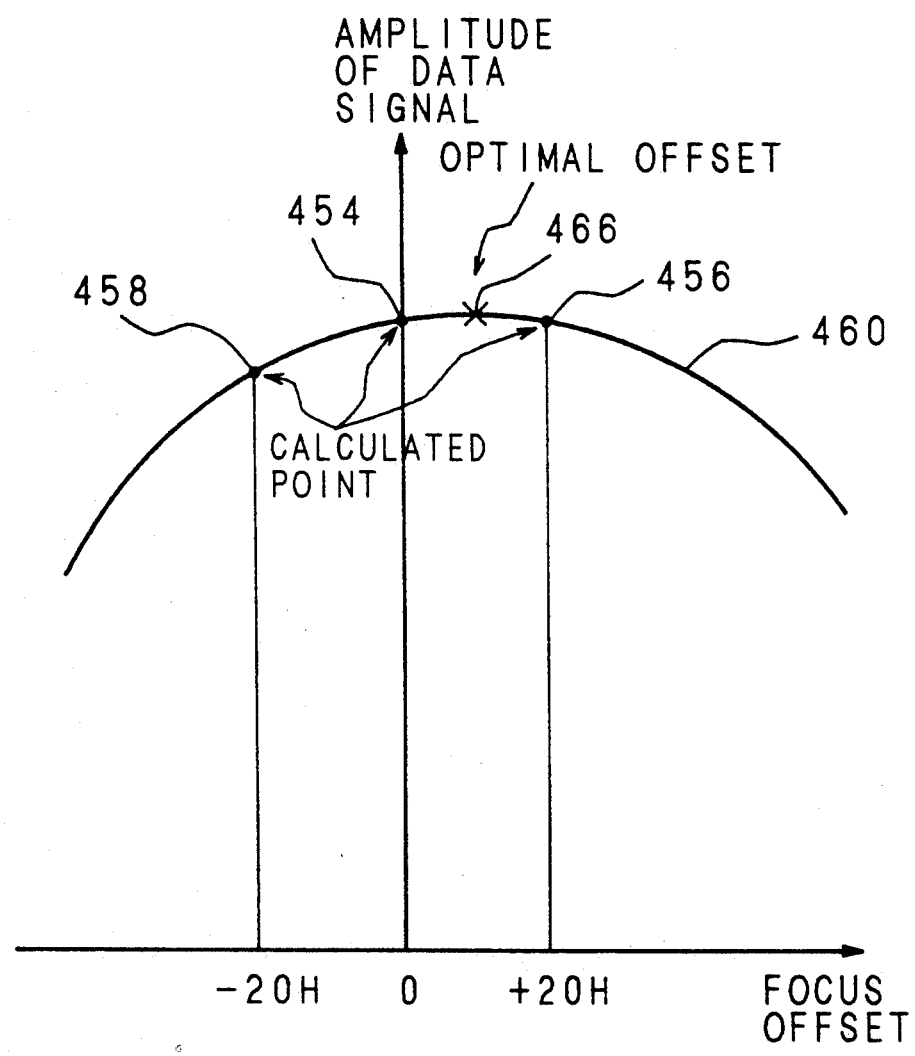
FIG. 22 is a graph of a track cross signal amplitude as a function of focus offset showing the optimum offset determined by the configuration of FIG. 21.
Figure 23:
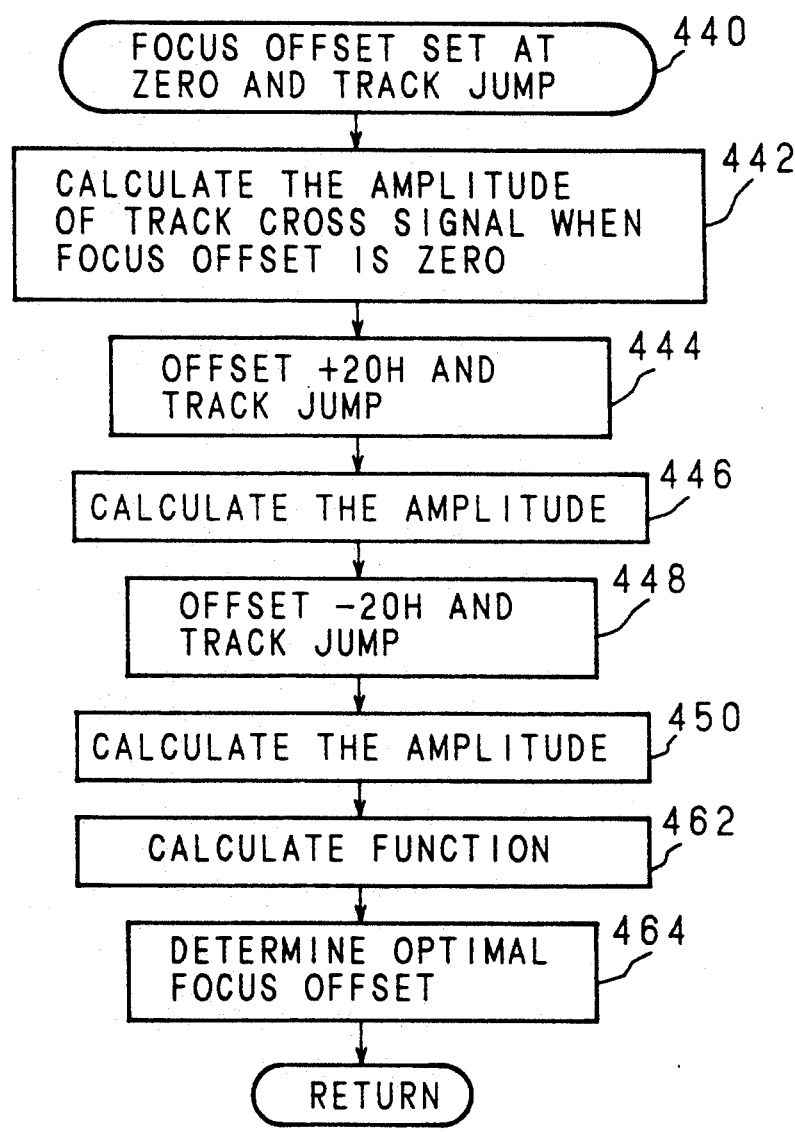
FIG. 23 is a flow chart showing the operation of the configuration of FIG. 21.

A block diagram of an optical disk drive configuration for detecting the focus offset value from the track cross signal is shown in FIG. 21. Like elements in FIGS. 18 and 21 have the same reference numerals. A flow chart of the process performed by the circuit of FIG. 21 is shown in FIG. 23. The amplitude of the track cross signal as a function of focus offset is shown in FIG. 22. As indicated in FIG. 11, the track cross signal 252 has a maximum amplitude at the center of a data track. The outputs of photodetectors 32 and 34 are connected through preamplifiers 36 and 38, respectively, to the inputs of a summing amplifier 420. The output of summing amplifier 420 is the track cross signal as shown in FIG. 11. The track cross signal is digitized by an ADC 422. The output of ADC 422 is connected to a maximum value register 424, a minimum value register 426 and one input of a comparator 428. The outputs of registers 424 and 426 are connected to the inputs of a multiplexer 430. The output of multiplexer 430 is connected to the other input of comparator 428 and to the microprocessor 62.

In order to determine the focus offset, the microprocessor 62 supplies a focus offset of 0 to offset add-/gain switch circuit 364 and issues a track jump command signal to adder 70, as shown in step 440 of FIG. 23. During the track jump, the circuitry comprising maximum value register 424, minimum value register 426, comparator 428 and multiplexer 430 receive the track cross signal from ADC 422 and determine its maximum and minimum values. Microprocessor 62 then determines the amplitude of the track cross signal in step 442 from the maximum and minimum values. In a similar manner, the microprocessor 62 successively provides offsets of 0+20H and 0−20H to offset add-/gain switch circuit 364 and determines the amplitude of the track cross signal for each offset as shown in steps 444, 446, 448 and 450. The track cross signal amplitudes are shown in FIG. 22 as points 454, 456 and 458 for offsets of 0, +20H and −20H, respectively. As described above, a curve 460 through points 454, 456 and 458 is approximated by an upwardly-convex quadratic function in step 462. The focus offset is determined in step 464 as the offset value at a point 466 where the curve 460 is maximum. The focus offset value is stored in memory 64. As described above, the stored offset values are used to adjust the focus servo circuit by providing the corresponding stored focus offset value to the offset add/gain switch circuit 364 as the optical head is tracking in each region of the optical disk.

Figure 27:
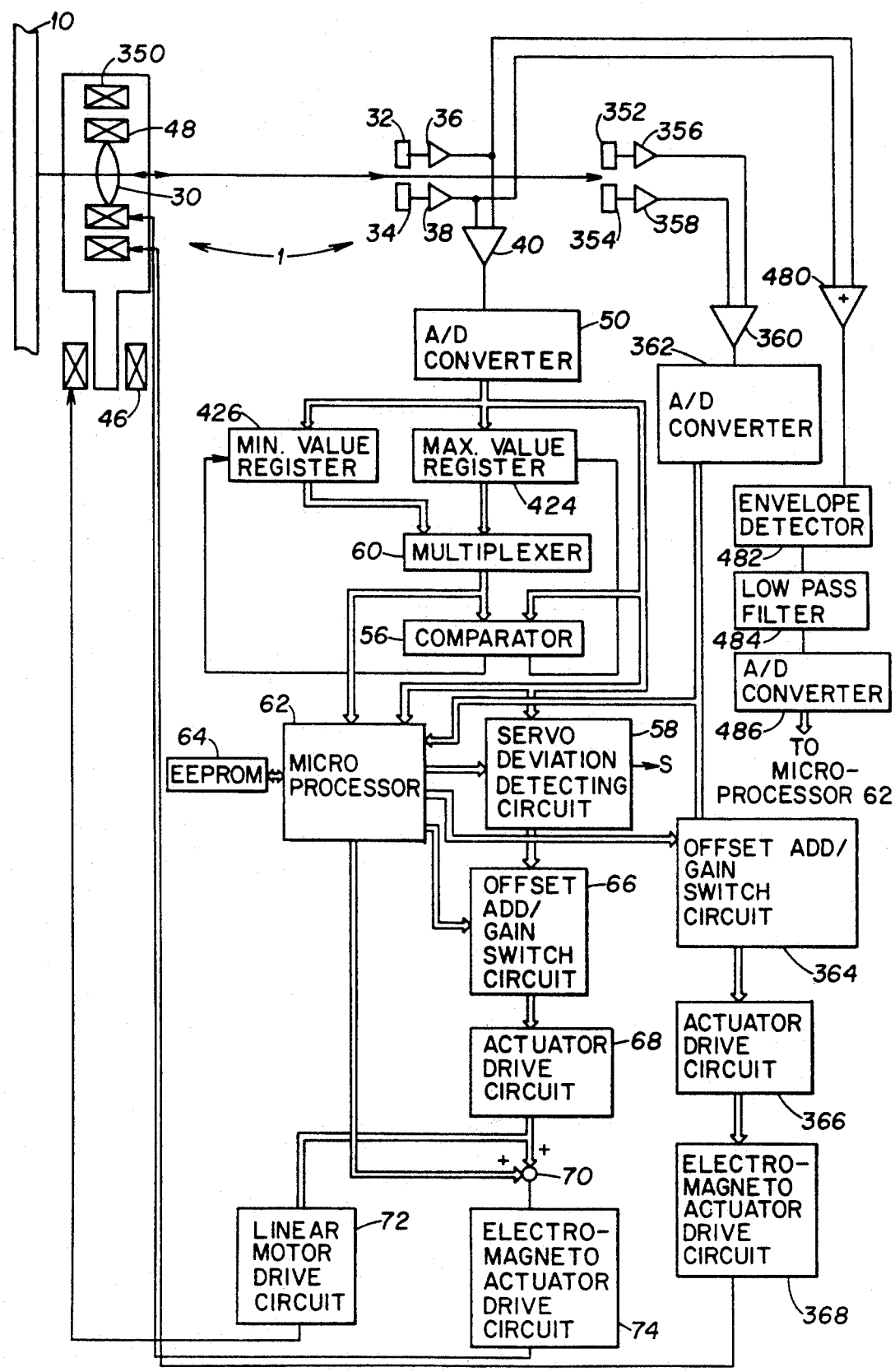
FIG. 27 is a schematic block diagram of an optical disk drive configuration showing a technique for obtaining focus offset from the reproduced data signal.

A block diagram of another optical disk drive configuration for measuring focus offset in each region of the optical disk is shown in FIG. 27. Like elements in FIG. 1 and FIG. 27 have the same reference numerals. The outputs of photodetectors 32 and 34 are coupled through preamplifiers 36 and 38, respectively, to the inputs of a summing amplifier 480. The output of summing amplifier 480 is coupled through an envelope detector 482 and a lowpass filter 484 to an ADC 486. The envelope detector 482 detects the envelope amplitude of the reproduced signal. The ADC 486 provides a digitized form of the envelope of the reproduced signal to microprocessor 62. The microprocessor 62, as described above in connection with FIGS. 18 and 21, provides focus offsets of 0, +20H and −20H to the focus servo circuit. The amplitude of the reproduced signal in the header is measured for each of the three offset values. The three measured amplitudes are used to determine an upwardly convex quadratic function as described above. The focus offset value at the maximum of the quadratic function is the optimum focus offset value. The optimum focus offset value is determined and stored in the same manner for each region of the optical disk. This technique can also be used to measure preformatted data signals or recorded data signals, but the measured offset value is less accurate than for the header.

Figure 24:
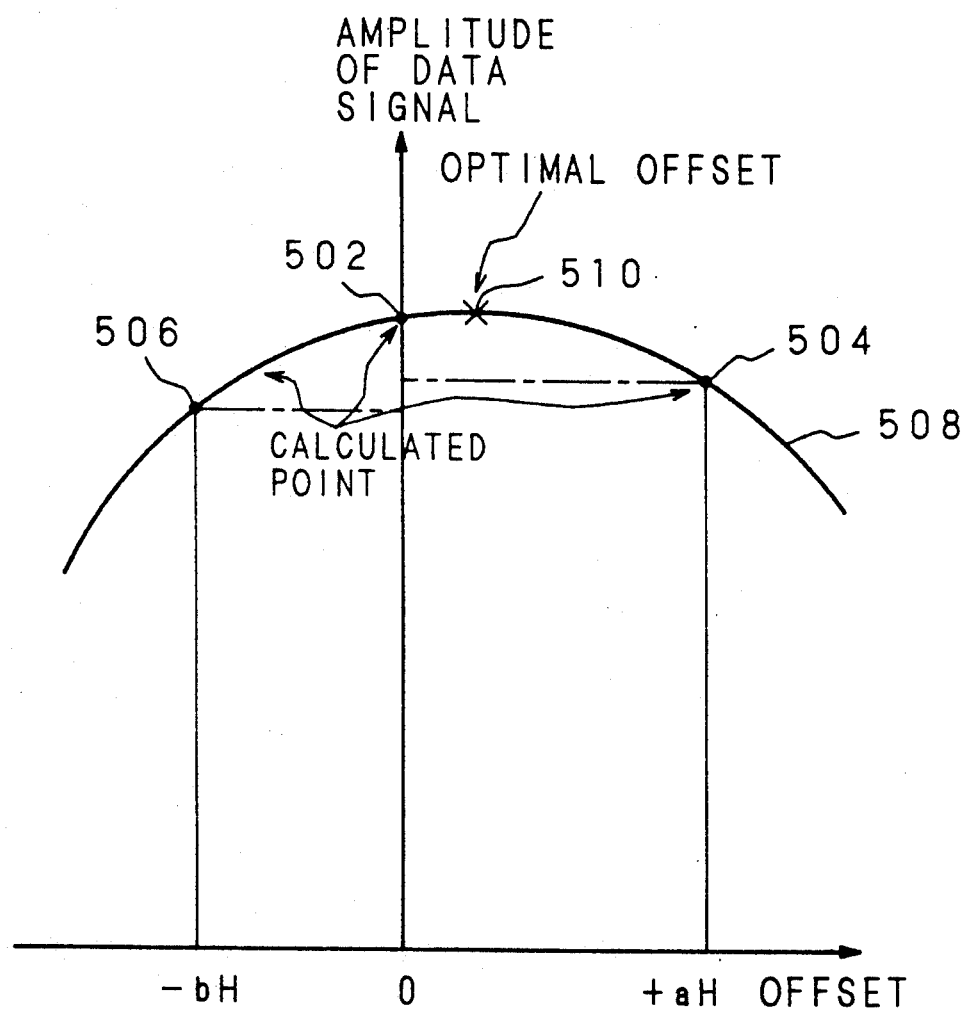
FIG. 24 is a graph of signal amplitude as a function of offset illustrating another technique for obtaining optimal offset.
Figure 25:
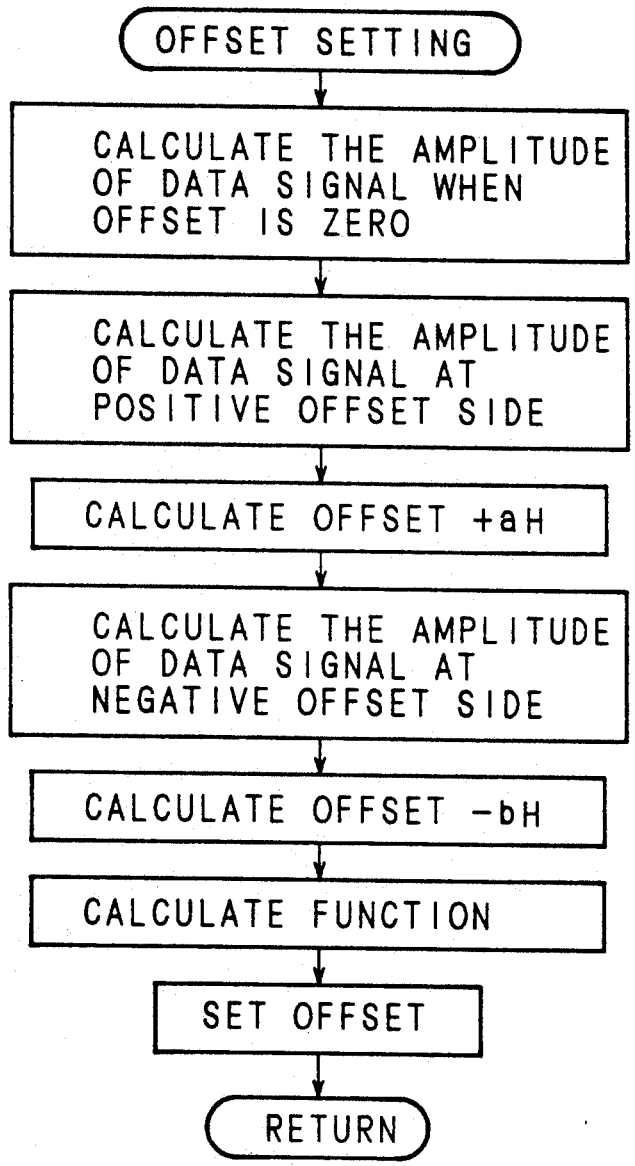
FIG. 25 is a flow chart showing the method for obtaining optimum offset as illustrated in FIG. 24.

As described above, tracking offset and focus offset can be obtained by a three point method wherein offset values of 0, +20H and −20H are used and the corresponding signal amplitudes are measured. A variation of this technique is shown in FIGS. 24 and 25. Offset values of +aH and −bH are utilized. In this case, the positive and negative offset values are not equal. The signal amplitudes are measured at point 502 corresponding to 0 offset, point 504 corresponding to an offset of +aH and point 506 corresponding to an offset of −bH. The points 502, 504 and 506 define a curve 508 which can be approximated by an upwardly convex quadratic function. The quadratic function can be determined by microprocessor 62 using well known curve fitting techniques. The optimum value of offset at point 510 is the offset corresponding to the maximum of curve 508. A flow chart for determining the optimum offset in accordance with FIG. 24 is shown in FIG. 25.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An optical disk drive which irradiates a beam onto an optical disk, and controls irradiation of said beam using a servo-circuit responsive to reflected light of the irradiated beam, comprising:
    means for detecting a calibrating value for said servo-circuit in a plurality of regions on said optical disk, said plurality of regions being located within a data recording zine and comprising track groups in a radial direction and sector groups in a circumferential direction, and means for calibrating the servo-circuit in each of said regions using the calibrating value detected by said detecting means in each of said regions, the calibrated servo-circuit controlling irradiation of the beam.

2. An optical disk drive which irradiates a beam onto an optical disk, comprising:
    a servo-circuit for controlling irradiation of said beam in response to reflected light of the irradiated beam;
    means for detecting a maximum value and a minimum value of a signal obtained by crossing an arbitrary track in a plurality of regions on said optical disk, and means for determining a median between the detected maximum value and minimum value, said median constituting an offset value, said servo-circuit being controlled in response to the determined offset value in each of said regions.

3. An optical disk drive which irradiates a beam onto an optical disk, comprising:
    a servo-circuit for controlling a position of irradiation of said beam in response to a reflected beam of the irradiated beam,
    means for detecting a maximum value and a minimum value of a signal obtained by crossing an arbitrary track in a plurality of regions on said optical disk, and means for determining a threshold value for detecting servo deviation in response to the detected maximum value and minimum value in each of said regions.

4. An optical disk drive which irradiates a beam onto an optical disk, comprising:
   a servo-circuit for controlling a position of irradiation of said beam in response to reflected light of the irradiated beam,
   means for detecting a maximum value and a minimum value of a signal obtained by crossing an arbitrary track in a plurality of regions on said optical disk, means for detecting an amplitude of said signal from the detected maximum value and minimum value, and means for changing a sensor gain to a changed sensor gain so as to keep the detected amplitude constant, the servo-circuit being controlled in each of said regions by the changed sensor gain.

5. An optical disk drive performing tracking control for making a projected light beam follow a recording track on an optical disk, comprising:
   means for detecting the amplitude of a signal obtained from reflected light of the beam irradiated onto a plurality of regions on said optical disk, means for supplying an offset value to said tracking control, means for calculating a function showing a relation between tracking control and amplitude from the amplitude of said signal obtained at least at three different positions of tracking control, and means for calculating the offset value of tracking control of each of said regions to obtain a position of tracking control related to a maximum value of said function, the tracking control of each of said regions being calibrated by the calculated offset value.

6. An optical disk drive performing focus control for making a projected light beam follow a recording track on an optical disk, comprising:
   means for detecting an amplitude of a signal obtained from reflected light of the beam irradiated onto a plurality of regions on said optical disk, means for supplying an offset value to said focus control, means for calculating a function showing a relation between focus control and amplitude from the amplitude of said signal obtained at least at three different positions of focus control, and means for calculating the offset value of focus control of each of said regions so as to obtain a position of focus control related to a maximum value of said function, the focus control of each of said regions being calibrated by the calculated offset value.

7. An optical disk drive comprising:
   means for rotating an optical disk having a plurality of recording tracks;
   means for directing a beam onto an arbitrary track selected from said plurality of recording tracks;
   a servo-circuit for controlling the position of said beam on said arbitrary track in response to a tracking signal representative of the radial position of said beam on said arbitrary track;
   means for moving said beam across at least one of said plurality of tracks;
   means for measuring maximum value and a minimum value of said tracking signal as said beam moves across said at least one of said tracks and for determining a median of said maximum and minimum values, said median constituting a tracking offset value; and
   means for adjusting said servo-circuit by said tracking offset value as said beam is tracking on said arbitrary track.

8. An optical disk drive as defined in claim 7 wherein said means for moving said beam includes means for alternately moving said beam from an inner peripheral edge to an outer peripheral edge of a selected track and moving said beam from the outer peripheral edge to the inner peripheral edge of the selected track.

9. An optical disk drive as defined in claim 7 wherein said means for moving said beam includes means for moving said beam across a predetermined number of said recording tracks.

10. An optical disk drive as defined in claim 7 wherein said means for moving said beam includes means for moving said beam at a constant velocity.

11. An optical disk drive comprising:
   means for rotating an optical disk having a plurality of recording tracks;
   means for directing a beam onto an arbitrary track selected from said plurality of tracks;
   a servo circuit for controlling the position of said beam on said arbitrary track;
   means for moving said beam to at least three radial positions on a selected track, said radial positions corresponding to different tracking offset values;
   means for determining a reproduced signal amplitude for each of said different tracking offset values;
   means for determining a quadratic function defined by the reproduced signal amplitudes and the corresponding tracking offset values;
   means for determining an optimal tracking offset value corresponding to a maximum of said quadratic function; and
   means for adjusting said servo-circuit by said optimal tracking offset value when said beam is tracking on said arbitrary track.

12. An optical disk drive comprising:
   means for rotating an optical disk having recording tracks and a plurality of regions located within a data recording zoned, said plurality of regions comprising track groups in a radial direction and sector groups in a circumferential direction;
   means for directing a beam onto an arbitrary track selected from said recording tracks;
   a servo-circuit for controlling said beam;
   means responsive to light of said beam reflected from said optical disk for determining a calibration value for each of said plurality of regions on said optical disk; and
   means for adjusting said servo-circuit in accordance with the calibration value of the region of said optical disk in which said beam is located.

13. An optical disk drive as defined in claim 12 wherein said means for determining a calibration value for each of said plurality of regions comprises:
   means for moving said beam across at least one of said recording tracks; and
   means for measuring a maximum value and a minimum value of a tracking signal representative of the radial position of said beam on said arbitrary track as said beam moves across said at least one of said tracks and for determining a median of said maximum and minimum values, said median constituting a tracking offset calibration value for adjusting said servo-circuit.

14. An optical disk drive as defined in claim 12 wherein said means for determining a calibration value for each of said plurality of regions comprises:
   means for moving said beam across at least one of said recording tracks; and means for measuring a track cross signal which reaches a maximum amplitude at the center of each of said recording tracks and for measuring the amplitude of a tracking signal representative of the radial position of said beam on said arbitrary track when said track cross signal has maximum amplitude, the measured value of said tracking signal when said track cross signal has maximum amplitude constituting a tracking offset calibration value for adjusting said servo-circuit.

15. An optical disk drive as defined in claim 12 wherein said means for determining a calibration value for each of said plurality of regions comprises:
means for moving said beam across at least one of said recording tracks; and p1 means for measuring a maximum value and a minimum value of a tracking signal representative of the radial position of said beam on said arbitrary track as said beam moves across said at least one of said tracks and for determining positive and negative servo deviation thresholds as predetermined fractions of said maximum and minimum values, said servo deviation thresholds constituting said calibration values.

16. An optical disk drive as defined in claim 12 wherein said means for determining a calibration value for each of said plurality of regions comprises:
means for moving said beam across at least one of said recording tracks; and
means for measuring an amplitude of a tracking signal representative of the radial position of said beam on said arbitrary track as said beam moves across said at least one of said tracks and determining a gain value required to adjust the amplitude of said tracking signal to a desired value, said gain value constituting said calibration value.

17. An optical disk drive comprising:
means for rotating an optical disk having a plurality of recording tracks;
means for directing a beam onto an arbitrary track selected from said plurality of tracks;
a servo circuit for controlling the focus of said beam on said optical disk;
means for setting the focus of said beam to at least three different focus offset values and for moving said beam across at least one of said plurality of tracks at each of said different focus offset values;
means for determining a track sensing signal amplitude for each of said different focus offset values;
means for determining a quadratic function defined by the track sensing signal amplitudes and the corresponding focus offset values;
means for determining an optimal focus offset value corresponding to a maximum of said quadratic function; and
means for adjusting said servo circuit by said optimal focus offset value.

18. An optical disk drive as defined in claim 17 wherein said means for determining a track sensing signal amplitude includes means for determining the amplitude of a tracking signal which has a value of zero at the center of each of said plurality of tracks and maximum and minimum values at the edges of each of said plurality of tracks.

19. An optical disk drive as defined in claim 17 wherein said means for determining a track sensing signal amplitude comprises means for determining the amplitude of a track cross signal which has a maximum value at the center of each of said plurality of tracks.

20. An optical disk drive comprising:
means for rotating an optical disk having a plurality of recording tracks;
means for directing a beam onto an arbitrary track selected from said plurality of tracks;
a servo circuit for controlling the focus of said beam on said optical disk;
means for setting the focus of said beam to at least three different focus offset values;
means for determining a reproduced signal amplitude for each of said different focus offset values;
means for determining a quadratic function defined by the reproduced signal amplitudes and the corresponding offset values;
means for determining an optimal focus offset value corresponding to the maximum of said quadratic function; and
means for adjusting said servo circuit by said optimal focus offset value when said beam is tracking on said arbitrary track.

21. An optical disk drive comprising:
means for rotating an optical disk having a plurality of recording tracks;
means for directing a beam onto an arbitrary track selected from said plurality of recording tracks;
a servo-circuit for controlling the position of said beam on said arbitrary track in response to a tracking signal representative of the radial position of said beam on said arbitrary track;
means for moving said beam across at least one of said plurality of tracks;
means for measuring a maximum value and a minimum value of said tracking signal as said beam moves across said at least one of said tracks and for determining positive and negative servo deviation thresholds as predetermined fractions of said maximum and minimum values; and
means for detecting an out-of-servo condition when said beam is tracking on said arbitrary track and said tracking signal exceeds one of said servo deviation thresholds.

22. An optical disk drive comprising:
means for rotating an optical disk having a plurality of recording tracks;
means for directing a beam onto an arbitrary track selected from said plurality of recording tracks;
a servo circuit for controlling the position of said beam on said arbitrary track in response to tracking signal representative of the radial position of said beam on said arbitrary track, said servo circuit including an actuator for controlling the position of said beam in response to an actuator drive current;
means for moving said beam across at least one of said plurality of tracks;
means for measuring a maximum value and a minimum value of said tracking signal as said beam moves across said at least one of said tracks for at least two different values of said actuator drive current and determining an optimal actuator drive current for which a tracking offset value is zero;
means for adjusting said servo circuit such that said optimal actuator drive current is provided to said actuator when said beam is tracking on said arbitrary track.

23. A optical disk drive comprising:
means for rotating an optical disk having recording tracks and a plurality of regions;

means for directing a beam onto an arbitrary track selected from said recording tracks;

a servo-circuit for controlling said beam;

means for determining a calibration value for each of said plurality of regions on said optical disk, said means for determining a calibration valve for each of said plurality of regions comprising:

means for moving said beam to at least three radial positions on a selected track, said radial positions corresponding to different tracking offset values;

means for determining a reproduced signal amplitude for each of said different tracking offset values;

means for determining a quadratic function defined by the reproduced signal amplitudes and the corresponding tracking offset values; and means for determining an optimal tracking offset value corresponding to the maximum of said quadratic function, said optimal tracking offset value constituting said calibration value; and means for adjusting said servo-circuit in accordance with the calibration value for the region of said optical disk in which said beam is located.

24. An optical disk drive comprising:

means for rotating an optical disk having recording tracks and a plurality of regions;

means for directing a beam onto an arbitrary track selected from said recording track;

a servo-circuit for controlling said beam;

means for determining a calibration value for each of said plurality of regions on said optical disk, said means for determining a calibration value for each of said plurality of regions comprising:

means for setting the focus of said beam to at least three different focus offset values and for moving said beam across at least one of said recording tracks at each of said different focus offset values;

means for determining a track sensing signal amplitude for each of said different focus offset values;

means for determining a quadratic function defined by the track sensing signal amplitudes and the corresponding focus offset values; and means for determining an optimal focus offset value corresponding to a maximum of said quadratic function, said optimal focus offset value constituting said calibration value; and means for adjusting said servo-circuit in accordance with the calibration value for the region of said optical disk in which said beam is located, 25. An optical disk drive comprising:

means for rotating an optical disk having recording tracks and a plurality of regions;

means for directing a beam onto an arbitrary track selected from said recording tracks;

a servo-circuit for controlling said beam;

means for determining a calibration value for each of said plurality of regions on said optical disk, said means for determining a calibration value for each of said plurality of regions comprising:

means for setting the focus of said beam to at least three different focus offset values;

means for determining a reproduced signal amplitude for each of said different focus offset values;

means for determining a quadratic function defined by the reproduced signal amplitudes and the corresponding offset values; and means for determining an optimal focus offset value corresponding the maximum of said quadratic function, said optimal focus offset value constituting said calibration value; and means for adjusting said servo-circuit in accordance with the calibration value for the region of said optical disk in which said beam is located.

* * * * *